United States Patent
Mayo

(10) Patent No.: US 10,008,772 B2
(45) Date of Patent: Jun. 26, 2018

(54) PHASED ARRAY ANTENNA AND A METHOD OF OPERATING A PHASED ARRAY ANTENNA

(71) Applicant: Phasor Solutions Limited, Ledbury Hereford And Worcester (GB)

(72) Inventor: Richard Mayo, Ledbury Hereford And Worcester (GB)

(73) Assignee: Phasor Solutions Limited (GB)

( * ) Notice: Subject to any disclaimer, the term of this patent is extended or adjusted under 35 U.S.C. 154(b) by 888 days.

(21) Appl. No.: 14/083,576

(22) Filed: Nov. 19, 2013

(65) Prior Publication Data

US 2014/0077996 A1   Mar. 20, 2014

Related U.S. Application Data

(63) Continuation of application No. 12/988,923, filed as application No. PCT/GB2009/050880 on Jul. 17, 2009, now Pat. No. 9,300,040.

(30) Foreign Application Priority Data

Jul. 18, 2008   (GB) .................................. 0813237.5

(51) Int. Cl.
*H01Q 3/34* (2006.01)
*H01Q 1/32* (2006.01)
(Continued)

(52) U.S. Cl.
CPC ............ *H01Q 3/34* (2013.01); *H01Q 1/3216* (2013.01); *H01Q 1/3275* (2013.01);
(Continued)

(58) Field of Classification Search
CPC ...... H01Q 3/34; H01Q 1/3216; H01Q 1/3275; H01Q 3/2605; H01Q 3/267; H04B 7/0848
(Continued)

(56) References Cited

U.S. PATENT DOCUMENTS

| 3,384,895 A | 5/1968 | Webb |
| 3,725,938 A | 4/1973 | Black et al. |

(Continued)

FOREIGN PATENT DOCUMENTS

| CN | 101039135 A | 9/2007 |
| EP | 0987560 A1 | 3/2000 |

(Continued)

OTHER PUBLICATIONS

Office Action dated Sep. 16, 2015 for related U.S. Appl. No. 12/988,923.

(Continued)

*Primary Examiner* — Frank J McGue
(74) *Attorney, Agent, or Firm* — Reza Mollaaghababa; Thomas Engellenner; Pepper Hamilton LLP

(57) ABSTRACT

An element of a phased array antenna is provided. The element comprises a phase tracking circuit configured to multiply the in-phase component (In) of a local output signal by the quadrature phase component (Qout) of an external output signal to generate a phase control signal (535) and/or to multiply the quadrature component (Qn) of a local output signal by the in-phase component (Iout) of an external output signal to generate a phase control signal (535).

31 Claims, 13 Drawing Sheets

(51) Int. Cl.
*H01Q 3/26* (2006.01)
*H04B 7/08* (2006.01)

(52) U.S. Cl.
CPC .......... *H01Q 3/2605* (2013.01); *H01Q 3/267* (2013.01); *H04B 7/0848* (2013.01)

(58) Field of Classification Search
USPC .................................................. 342/371
See application file for complete search history.

(56) References Cited

U.S. PATENT DOCUMENTS

| | | | |
|---|---|---|---|
| 3,787,775 A | 1/1974 | Lanning | |
| 3,967,279 A | 6/1976 | Zeger | |
| 4,044,396 A | 8/1977 | Haws et al. | |
| 4,117,487 A | 9/1978 | Minohara et al. | |
| 4,132,995 A | 1/1979 | Monser | |
| 4,148,031 A | 4/1979 | Tausworthe et al. | |
| 4,162,499 A | 7/1979 | Jones, Jr. et al. | |
| 4,287,518 A | 9/1981 | Ellis, Jr. | |
| 4,387,597 A | 6/1983 | Brandestini | |
| 4,394,660 A * | 7/1983 | Cohen .................. | H01Q 3/36 331/107 R |
| 4,431,998 A | 2/1984 | Finken | |
| 4,675,685 A | 6/1987 | Finken | |
| 4,682,181 A | 7/1987 | Dumas et al. | |
| 4,816,775 A * | 3/1989 | Ryan ...................... | H03L 7/087 331/12 |
| 4,998,181 A | 3/1991 | Haws et al. | |
| 5,126,751 A | 6/1992 | Wada et al. | |
| 5,128,689 A | 7/1992 | Wong et al. | |
| 5,184,141 A | 2/1993 | Connolly et al. | |
| 5,216,435 A | 6/1993 | Hirata et al. | |
| 5,276,455 A | 1/1994 | Fitzsimmons et al. | |
| 5,493,305 A | 2/1996 | Wooldridge et al. | |
| 5,504,453 A | 4/1996 | MacDonald et al. | |
| 5,585,803 A * | 12/1996 | Miura ...................... | H01Q 3/26 342/157 |
| 5,702,073 A | 12/1997 | Fluegel | |
| 5,857,004 A | 1/1999 | Abe | |
| 5,872,815 A | 2/1999 | Strolle et al. | |
| 5,886,671 A | 3/1999 | Riemer et al. | |
| 5,894,494 A | 4/1999 | Davidovici | |
| 6,198,445 B1 | 3/2001 | Alt et al. | |
| 6,297,775 B1 | 10/2001 | Haws et al. | |
| 6,305,463 B1 | 10/2001 | Salmonson | |
| 6,414,644 B1 | 7/2002 | Desargant et al. | |
| 6,553,083 B1 | 4/2003 | Kawai | |
| 6,693,590 B1 * | 2/2004 | Toplicar .................. | H01Q 3/26 342/372 |
| 6,714,163 B2 | 3/2004 | Navarro et al. | |
| 6,903,931 B2 | 6/2005 | McCordic et al. | |
| 6,904,104 B1 | 6/2005 | Khullar et al. | |
| 6,961,028 B2 | 11/2005 | Joy et al. | |
| 7,092,690 B2 | 8/2006 | Zancewicz | |
| 7,132,990 B2 | 11/2006 | Stenger et al. | |
| 7,253,777 B2 | 8/2007 | Blaschke et al. | |
| 7,325,772 B1 | 2/2008 | Hanewinkel, III et al. | |
| 7,372,414 B2 | 5/2008 | Soiron et al. | |
| 7,508,338 B2 | 3/2009 | Pluymers et al. | |
| 7,786,937 B1 | 8/2010 | Stierhoff et al. | |
| 7,860,189 B2 | 12/2010 | Petilli et al. | |
| 7,889,135 B2 | 2/2011 | Blaser et al. | |
| 7,898,810 B2 | 3/2011 | Mason et al. | |
| 7,957,457 B2 | 6/2011 | Rofougaran | |
| 7,990,298 B1 | 8/2011 | Friedmann et al. | |
| 8,106,823 B2 | 1/2012 | Schroth | |
| 8,279,131 B2 | 10/2012 | Puzella et al. | |
| 8,654,017 B1 | 2/2014 | Voss et al. | |
| 9,276,792 B1 | 3/2016 | Makinwa et al. | |
| 9,300,040 B2 | 3/2016 | Mayo | |
| 2002/0135513 A1* | 9/2002 | Paschen ................ | H01Q 3/267 342/371 |
| 2003/0091105 A1 | 5/2003 | Schilling | |
| 2004/0092240 A1 | 5/2004 | Hayashi | |
| 2005/0249321 A1 | 11/2005 | Dawson et al. | |
| 2006/0046648 A1 | 3/2006 | DiFonzo et al. | |
| 2006/0097699 A1 | 5/2006 | Kamenoff | |
| 2008/0004078 A1* | 1/2008 | Barratt .................. | H04B 7/084 455/562.1 |
| 2008/0114224 A1 | 5/2008 | Bandy et al. | |
| 2008/0161660 A1 | 7/2008 | Arneson et al. | |
| 2008/0212662 A1 | 9/2008 | Lee et al. | |
| 2010/0120386 A1 | 5/2010 | Konstantinos et al. | |
| 2011/0146957 A1 | 6/2011 | Buchholz et al. | |
| 2011/0291889 A1 | 12/2011 | Mayo | |
| 2012/0038525 A1 | 2/2012 | Monsalve Carcelen et al. | |
| 2014/0139400 A1 | 5/2014 | Voss et al. | |
| 2014/0218222 A1 | 8/2014 | Yamagata et al. | |
| 2016/0087824 A1 | 3/2016 | Makinwa et al. | |

FOREIGN PATENT DOCUMENTS

| | | |
|---|---|---|
| EP | 1538698 A1 | 6/2005 |
| EP | 1703662 A1 | 9/2006 |
| EP | 1703662 B1 | 9/2006 |
| EP | 1798809 A1 | 6/2007 |
| EP | 1819064 A2 | 8/2007 |
| GB | 2314981 | 1/1998 |
| JP | 64015866 A | 1/1989 |
| JP | S6415866 | 1/1989 |
| JP | 03234128 A | 10/1991 |
| JP | H03234128 A | 10/1991 |
| JP | 2000031874 | 1/2000 |
| JP | 2000031874 A | 1/2000 |
| WO | 200177706 A1 | 10/2001 |
| WO | 2001077706 A1 | 10/2001 |
| WO | 2007080141 | 7/2007 |
| WO | 2007080141 A1 | 7/2007 |
| WO | 2010007442 A1 | 1/2010 |
| WO | 2010007637 A1 | 1/2010 |
| WO | 2010029125 A1 | 3/2010 |
| WO | 2011007164 A2 | 1/2011 |
| WO | 2014030016 A2 | 2/2014 |

OTHER PUBLICATIONS

Australian Examination Report No. 1 Application No. 2009272440, dated Dec. 19, 2012 (3 pages).
Mayo, R. "A low-cost conformal phased array satellite antenna for trains", Institution of Engineering and Technology Seminar on Broadband on Trains, Feb. 20, 2007, London, UK, Feb. 20, 2007, pp. 105-114, XP009124095 Stevenage, UK p. 110-113.
Barrett M et al. "Adaptive Anennas for Mobile Communications", Electronics and Communication Engineering Journal, Institution of Electgrical Engineers, London, GB, vol. 6, No. 4, Aug. 1, 1994, pp. 203-214, XP00469556 ISSN: 0954-0695, pp. 206-207 figure 4.
International Search Report, dated Oct. 23, 2009.
International preliminary Report, dated Jan. 18, 2011.
United Kingdom Examination Report, Application No. GB0813237,5, dated Jul. 8, 2010, pp. 1-2.
United Kingdom Notice of Allowance, Application No. GB0813237.5, dated Oct. 26, 2010, pp. 1-3.
United Kingdom Search Report, Application No. GB0813237.5, dated Apr. 23, 2009, p. 1.
United Kingdom Search Report, Application No. GB0813237.5, dated Oct. 8, 2008, pp. 1-2.
International Search Report and Written Opinion received in PCT/US2015/050532, dated Jul. 2, 2015; 9 pages.
Search Report received in GB Application No. 1403507.5, dated Sep. 4, 2014; 2 pages.
Search Report for GB1013049.0 dated Nov. 17, 2010 (1 sheet).
Examination Report, GB1215114.8, search date Dec. 19, 2012 (6 sheets).
International Search Report, PCT/GB2013/052235, dated May 26, 2014 (3 sheets).
Gregorwich W., "Conformal Airborne Arrays", 1997 IEEE, pp. 463-470.
Whicker, Lawrence R., et al., "RF-Wafer Scale Integration: A New Approach to Active Phased Arrays", Advanced Research Projects Agency, APMC'93, vol. 1, pp. 1-1-1-4.

(56) References Cited

OTHER PUBLICATIONS

Whicker Lawrence R., "RF-Wafer Scale Integration: A New Approach to Active Phased Arrays+", 1992 IEEE, Session 11: WSI Applications III, pp. 291-299.
Whicker Lawrence R., "Active Phased Array Technology Using Coplanar Packaging Technology", IEE Transactions on Antennas and Propagation, vol. 43, No. 9, Sep. 1995, pp. 949-952.
McIlvenna John F. et al., "EHF Monolithic Phased Arrays—A Stepping-Stone to the Future", 1998 IEEE, pp. 0731-0735.
Adler Charles O., "Two-Way Airborne Broadband Communications Using Phased Array Antennas", 2003 IEEE, vol. 2-925, pp. 1-8.
Aung Win, "Cooling Technology for Electronic Equipment", Hemisphere Publishing Corporation, 1988.
Greda L.A. et al., "An Active Phased Array for Mobile Satellite Communication at Ka-Band in LTCC Technology", Antennas and Propagation Society International Symposium, 2009. APSURSI '09. IEEE, Jun. 2009, pp. 1-4.
Greda Lukasz A. et al., "Tx-Terminal Phased Array for Satellite Communication at Ka-band", ATENNA project under contract No. 502843.
Erickson Grant J. et al., "Integrated Circuit Active Phased Array Antennas for Millimeter Wave Communications Applications", 1994 IEEE, pp. 848-851.
Driver M. C. et al., "Wafer Scale Integration", 1989 IEEE, pp. 1-10.
Wong H. et al., "An EHF Backplate Design for Airborne Active Phased Array Antennas", 1991 IEEE, OO-2, pp. 1253-1256.
Reddick J. A. III et al., "High Density Microwave Packaging Program Phase 1—Texas Instruments/Martin Marietta Team", 1995 IEEE, TU3D-2, pp. 173-176.
Schreiner Marc et al., "Architecture and Interconnect Technologies for a Novel Conformal Active Phased Array Radar Module", 2003 IEEE, IFTU-33, pp. 567-570.
Tang Raymond et al., "Array Technology", Proceedings of the IEEE, vol. 80, No. 1, Jan. 1992, pp. 173-182.
Jones William H. et al., "Connexion by Boeingsm—Broadband Satellite Communication System for Mobile Platforms", 2001 IEEE, pp. 755-758.
Kayton Myron, "One Hundred Years of Aircraft Electronics", Journal of Guidance, Control, and Dynamics, vol. 26, No. 2, Mar.-Apr. 2003, pp. 193-213.
Zimmerman R. H., et al., "Equipment Cooling Systems for Aircraft Part I Summary of Cooling System Study", WADC Technical Report 54-359, Sep. 1954.
Notice of Allowance received in GB Application No. 0813237.5 dated Oct. 26, 2010; 3 pages.
International Search Report received in PCT/GB2015/050532, dated Jul. 2, 2015; 3 pages.

\* cited by examiner

PHASED ARRAY ANTENNA AND A METHOD OF OPERATING A PHASED ARRAY ANTENNA

This application is a continuation of U.S. application Ser. No. 12/988,923 filed Jan. 5, 2011, which is a national phase entry under 35 U.S.C. § 371 of International Application No. PCT/GB2009/050880, filed Jul. 17, 2009, published in English, which claims the benefit of the filing date of GB Patent Application No. 0813237.5 filed Jul. 18, 2008, the disclosures of which are hereby incorporated herein by reference.

The present invention relates to a phased array antenna and a method of operating a phased array antenna, in particular, but not exclusively to phased array antenna systems/panels used in telecommunications systems.

Reflector antennas such as satellite dishes are used in telecommunications systems and are simple and well understood. Reflector antennas make up the majority of high gain antenna systems. In order to steer a reflector antenna, mechanical movement of the entire reflector is usually necessary, although alternatives such as mechanical or electrical displacement of the feed are also known.

The speed at which the beam can be steered by a reflector antenna is limited by the mechanical limitations of accelerating the mass of the reflector or other movable parts of the antenna. The mechanical precision of the movement mechanism also limits the pointing accuracy of the antenna beam. Also, any imprecision in the structure on which the reflector is mounted can reduce the gain of the reflector antenna as the physical location and/or direction of the reflector antenna can be compromised by the structure on which the antenna is mounted. Furthermore, structural deformation (such as stress and thermal expansion) of the reflector can reduce the structural accuracy of the reflector antenna, especially for large reflector antennas.

Reflector antennas are bulky and may be unsuitable for use on high-speed vehicles such as trains as they are susceptible to damage. For example, wind damage or damage from branches of trees that may brush against the train may displace and/or damage a reflector antenna.

An alternative to reflector antennas are phased array antennas, which consist of a number of antenna elements arranged in a grid pattern to form an array.

Phased array antennas can be planar and they provide an advantage over reflector antennas as they require considerably less physical depth for installation. However, phased array antennas are typically more expensive to construct and install due to the accuracy that is required during manufacture in order to provide a reliable antenna array. Accurate data in relation to the real physical locations of the individual phased array antenna elements relative to each other is required in order to adequately control the direction and focus of the phased array antenna and thereby adequately send and receive data.

US 2002/0135513 (Dean Alan Paschen et al.) discloses a distributed adaptive combining system for multiple aperture antennas including phased arrays, wherein each element within the antenna apparatus has an associated phase/time adjuster circuit.

Other phased array antenna systems are known in which the antenna elements are supported by a movable panel and movement of the panel is utilized when communicating with a satellite. Such panels are configured to be tilted and rotated in use.

Aspects and embodiments of the invention were devised with the foregoing in mind.

According to a first aspect of the invention there is provided a phased array antenna comprising a first antenna element and a plurality of second antenna elements configured to receive communications signals. The first antenna element comprising a controllable oscillator configured to provide an output signal for frequency converting a received communications signal to form a first element output signal. The phase of the output signal of the controllable oscillator is adjustable responsive to a phase control signal representative of a comparison between the first element output signal and frequency converted output signals of the plurality of second antenna elements. The first output signal may be constructively combinable with the output signals of the second elements.

According to a second aspect of the invention there is provided a method of setting the phase of a controllable oscillator of a first antenna element of a phased array antenna wherein the output signal of the controllable oscillator is used to frequency covert a received communications signal to form a first element output signal, the method comprising comparing the first element output signal with frequency converted output signals of a plurality of second antenna elements; generating a phase control signal representative of the comparison; adjusting the phase of the output signal generated by the controllable oscillator associated with the first antenna element in response to the phase control signal such that the first element output signal is constructively combinable with the output signals of the second elements.

Generating the phase control signal using signals received at a plurality of second elements can reduce the effect of noise, and allow a more accurate phase control signal to be generated because the noise associated with a signal received at a plurality of antenna elements can be less than the noise associated with a signal representative of signals received at a single antenna element.

Embodiments of the invention may provide improved communication systems, particularly those that can be used while a user of a communications device is in transit in a vehicle, for example to provide Internet access to a user on a train.

The phase of the output signal of the controllable oscillator may be adjusted relative to the phase of the communications signal received at the first antenna element.

The output signals may be constructively combinable if they are the same or are representative of the same value.

In some embodiments the first and second antenna elements may be configured to generate baseband signals.

The phase control signal may represent the result of a comparison between the first element output signal and a value or characteristic of a composite/mean/average of the output signals of the plurality of second antenna elements. Using a composite of signals received at the plurality of second elements enables signals received at each of the second elements to influence the phase control signal, and in some embodiments to equally influence the phase control signal.

The phase control signal may represent the result of a comparison between a data symbol represented by the first element output signal and a data symbol represented by the second element output signals. This can enable any time and phase differences between the communications signals received at the elements to be considered as statistically insignificant as any differences in the properties at the carrier frequency of the received communications signal may be reduced and/or removed when the communications signal is frequency converted into the data symbol domain.

The element output signals may be intermediate frequency (IF) signals representative of a data symbol or may be baseband signals.

The phase control signal may represent the result of a comparison between a data symbol represented by the first element output signal and a data symbol representative of the data symbols of a majority of the second element output signals. In this way, the output signal of the first element can be brought into concordance with the output signal of the majority of the second elements.

The first and second antenna elements may be configured to receive QPSK communications signals, and the phase control signal may comprise a representation of a degree of cross-correlation between in-phase and quadrature phase component output signals of the first and second antenna elements. The in-built phase characteristics of a QPSK signal, or any other phase shift-keying signal, can be beneficial when determining whether or not the relative phase of the output of the controllable oscillator should be adjusted.

The phase control signal may be representative of a degree of correlation between an in-phase component of a QPSK output signal of the first antenna element and a quadrature phase component of output signals of the plurality of second antenna elements; and/or the phase control signal may be representative of a degree of correlation between a quadrature phase component of a QPSK output signal of the first antenna element and an in-phase phase component of output signals of the plurality of second antenna elements.

In embodiments where the phase control signal is representative of both comparisons described above, the phase control signal can be used to more accurately adjust the relative phase of the controllable oscillator as it is representative of two sets of comparison data.

The phase control signal may be representative of the difference between the determined degrees of correlation, and may represent a time averaged value of the difference. This can reduce the effect of any unwanted signals that are present in both the in-phase and quadrature phase component signals. Time averaging the difference signal can reduce and/or minimize any coincidental correlations between the in-phase and quadrature phase component signals that may lead to an incorrect phase shift being applied to the controllable oscillator.

The comparison between the first element output signal and the output signals generated by the plurality of second antenna elements may comprise a comparison of codes embedded in the output signals. The codes embedded in the output signals may be determined from the communications signals received from a data source at the elements, and can allow communications signals from a desired data source to be identified to the exclusion of communications signals received from other data sources transmitting at the same frequency, in some embodiments even where the communications signals received from the other data sources are stronger than the signal received from the desired data source. The data source may be a satellite.

The first antenna element may further comprise a phase comparator component configured to compare the phase of the first element output signal with the phase of output signals of the plurality of second antenna elements to generate the phase control signal. Suitably, the phase comparator component may be derived from a Costas loop.

The phase control signal may represent any differences between the first element output signal and the average of the second element output signals. The phase control signal may provide an indication of the degree to which the controllable oscillator is out of phase with a communications signal received at the first antenna element.

The phased array antenna may further comprise a delay component associated with one or more of the first or second antenna elements, wherein the one or more delay components are configured to temporally align the output signals of the first and second antenna elements. Temporally aligning the output signals of the first and second elements can cause the output signals to be aligned in the time domain such that frequency converted output signals relating to a signal transmitted by a data source at an instance in time "t" are constructively combined with corresponding frequency converted output signals relating to the same signal that was transmitted at the same time "t." This can provide a combined signal with an improved signal to noise ratio and/or a higher quality of service (QoS) such as a lower bit error probability.

The plurality of second antenna elements may be configured such that the individual output signals of one or more of the second elements are given a weighting, and/or inhibited, in response to a power level control signal satisfying a criterion. The criterion may be a threshold, for example the criterion may be satisfied if the power level control signal is greater or less than the threshold.

The power level control signal for a second antenna element may be representative of a comparison between the output signal of that second antenna element and the output signals of the other second antenna elements. Inhibiting and/or adjusting a weighting associated with the output signals of one or more of the second elements can enable the phase control signal to be configured to more accurately adjust the relative phase of the controllable oscillator as there is an increased degree of control over how the phase control signal is generated. For example, the output signal of any faulty or obscured antenna elements can be excluded from the comparison of output signals when generating the phase control signal.

The phased array antenna may further comprise a memory configured to store coordinates associated with each of the first and second elements. The coordinates may identify the physical location of the elements in the phased array antenna.

The coordinates associated with each of the first and second antenna elements may be initially set in accordance with physical properties of the phased array antenna, and this can enable the phased array antenna to more quickly adjust the relative phase of the controllable oscillator to a desired value thereby more quickly focusing the phased array antenna onto a desired data source such as a satellite.

The coordinates associated with each of the first and second antenna elements can be adjusted in response to the phase control signal.

The phased array antenna may further comprise a processor configured to calculate a plane-of-best-fit for the coordinates. The phase control signal may comprise a signal that is configured to set the phase of the controllable oscillator to bring it into line with the plane-of-best-fit.

The phased array antenna may comprise one or more phased array antenna panels. There may be provided a vehicle, for example a train, comprising the phased array antenna.

There may be provided a computer program comprising machine or computer-readable program elements for configuring a phased array antenna to generate control signals for implementing a method according to an aspect of the invention, and/or to configure a phased array antenna of an aspect of the invention.

A carrier medium carrying a computer program may be provided. The carrier medium may be one of the following: solid-state memory; magnetic memory; CD-ROM; digital versatile disk (DVD); HD-DVD; read-write CD; Blu-ray Disk, an electronic signal; radio frequency carrier wave or optical carrier wave.

There may be provided a phased array antenna panel comprising a plurality of antenna elements, said plurality of antenna elements comprising a controllable oscillator and a Costas loop, wherein said controllable oscillator is configured such that the phase of the controllable oscillator is set in response to a control signal generated by the Costas loop.

According to a further aspect of the invention, there is provided an element of a phased array antenna comprising a Costas loop, wherein the Costas loop is configured to multiply the in-phase component of a local output signal by the quadrature phase component of an external output signal to generate a phase control signal.

According to a further still aspect of the invention, there is provided an element of a phased array antenna comprising a Costas loop, wherein the Costas loop is configured to multiply the quadrature component of a local output signal by the in-phase component of an external output signal to generate a phase control signal.

Using an external output signal can enable the Costas loop to provide improved phase control data by reducing effects of noise that may be received at the element. The phase control signal may cause the phase of a local oscillator to more quickly and/or more accurately be adjusted in order to lock the Costas loop.

The external output signal may be a consensus/composite of output signals generated by one or more further elements of the phased array antenna. Using a consensus of output signals can reduce the overall effects of noise received at the individual elements.

There may be a break in the Costas Loop associated with an element, where a consensus/composite of output signals of Costas Loops associated with other elements is used to derive the phase adjustment for the local oscillator for the element.

Specific embodiments in accordance with the present invention will now be described, by way of example only, with reference to the drawings.

One or more embodiments of the present invention relate to a phased array antenna, particularly a phased array antenna system/panel that can be used to provide an improved gain and signal-to-noise ratio when sending and receiving electromagnetic communications signals. The phased array antenna system may comprise one or more phased array antenna panels that automatically focus their beam of maximum gain to a transmitter or receiver of electromagnetic communications signals such as a satellite.

Focusing the phased array antenna system reduces the bandwidth of the phased array antenna acting as a receiver. The noise that the receiver is subjected to is proportional to the bandwidth of the system. As an example, if the bandwidth is reduced by a factor of 10 the signal-to-noise ratio is improved by 10 dB.

The bandwidth of the antenna system can be considered as the range of frequencies where the antenna characteristics (such as beamwidth, input impedance, pattern, polarization, side lobe level, gain, beam direction, radiation efficiency for example) are within an acceptable value.

The beam is focused by generating phase feedback signals that are used to set relative phase shifts that are applied to local controllable oscillators associated with each of the elements that are used as part of modulation/demodulation operations on communications signals used in telecommunications.

The phase feedback signals can be generated by comparing an output signal of an individual element with a "consensus output signal" that represents output signals of a plurality of other elements. A phase feedback signal adjusts the relative phase of the local oscillator associated with the individual element until an output signal of the individual element is the same as, or represents the same value as an output signal of the plurality of other elements. When the individual element provides the same output signal as the other elements, the local oscillator may be considered to be sufficiently phase-aligned with its received communications signal.

Use of the consensus output signal can enable a more accurate phase feedback signal to be generated as the overall noise associated with the consensus signal is less than the noise of the individual signals received at the individual elements.

Figure 1:
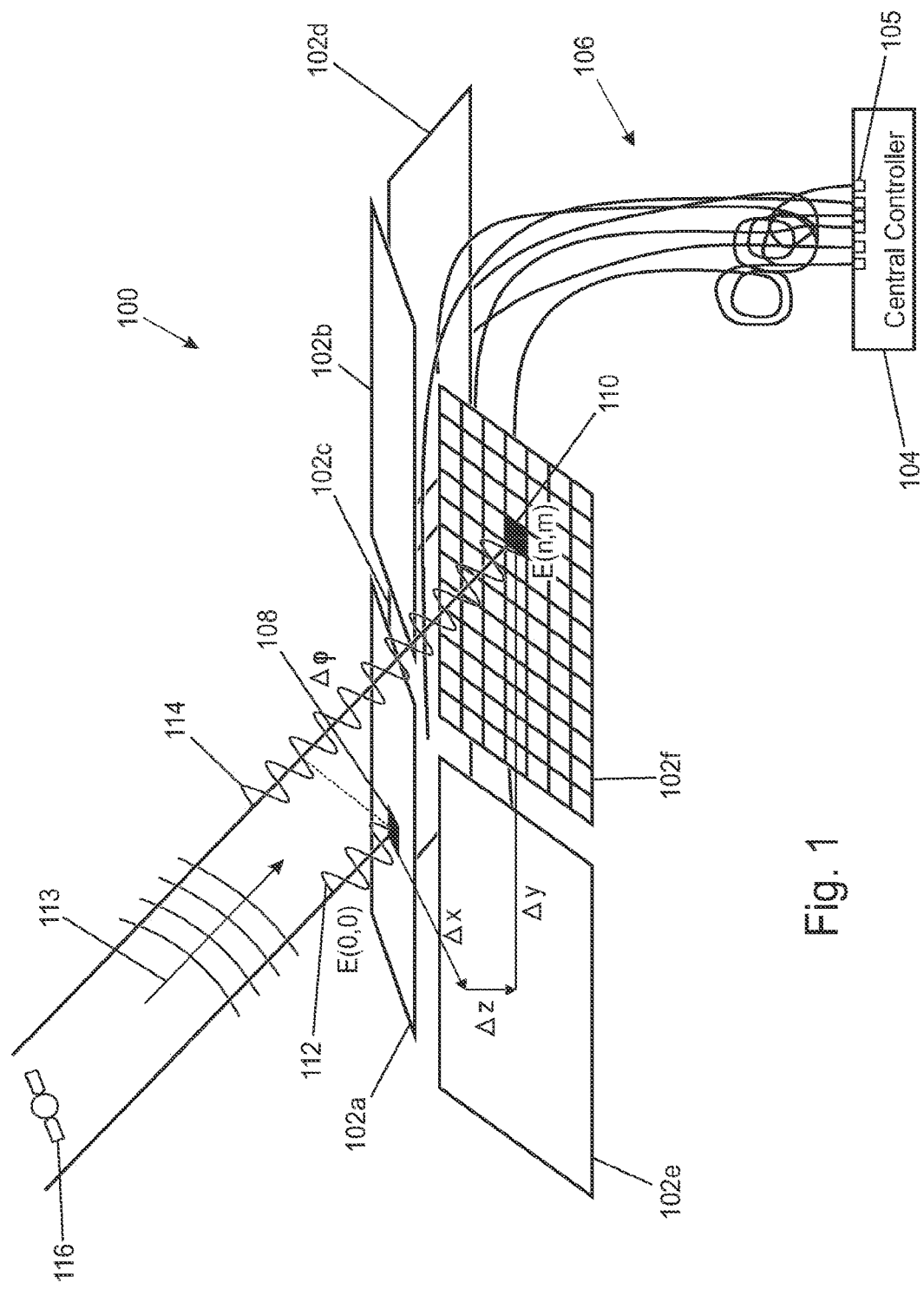
FIG. 1 shows a communications system according to an embodiment of the invention.

FIG. 1 shows a phased array antenna system 100 according to an embodiment of the invention. The phased array antenna system 100 comprises six phased array antenna panels 102a, 102b, 102c, 102d, 102e, 102f. Each phased array antenna panel 102 has a plurality of phased array antenna elements, two of which are illustrated as 108 and 110. The elements 108, 110 are coupled via the central controller 104 to a common source (not shown) when the system 100 is being used to transmit data, or a common load (not shown) when the system 100 is being used to receive data.

The phased array antenna panels 102 may be configured in any suitable orientation relative to each other, and in this embodiment the six phased array antenna panels 102 are illustrated in an arrangement that is suitable to be fitted to the roof of a train carriage.

Each of the phased array antenna panels 102 is connected to the central controller 104 by a fiber optic cable 106. The central controller 104 comprises fiber optic transceivers 105 configured to send and receive signals to/from the phased array antenna panels 102. In use, the controller 104 is located inside the train carriage to which the phased array antenna panels 102 are fitted.

The phased array antenna system 100 is configured to send and receive electromagnetic signals to/from a satellite 116 when in use. In this embodiment, two-way communication with the satellite 116 provides a telecommunication link, such as Internet access, that is accessible by a network on the train. For example, a passenger on the train may be able to use their laptop computer to connect to the network associated with the train in order to access the Internet using the phased array antenna system 100 as part of the communications link.

By way of illustration, two component signals 112, 114 are shown that correspond to the same electromagnetic radiation 113 emitted by the satellite 116 as received by elements 108, 110 of phased array antenna system 100. It will be appreciated that similar component signals of the electromagnetic radiation 113 emitted by satellite 116 are received by each of the other elements of the phased array, and all of these signals are not shown in FIG. 1 in order to aid clarity.

As illustrated in FIG. 1, there is a phase difference between the component signals 112, 114 received at different elements 108, 110 due to the different path-lengths from the satellite 116 to the individual elements 108, 110. The phase difference between the received component signals 112, 114 is dependent upon the path length from the satellite 116 to the elements 108, 110 of the phased array antenna system 100, and also the wavelength of the electromagnetic radiation 113.

In other embodiments, the phased array antenna system 100 may consist of any number of phased array antenna panels 102, and in some embodiments may consist of a single phased array antenna panel 102.

Each of the phased array elements 108, 110 are configured to receive a phase shift control signal such that the phase of a local controllable oscillator associated with each element 108, 110 can be automatically adjusted such that an overall beam generated by the phased array antenna panels 102 is focused onto the satellite 116.

An example phased array antenna system 100 may comprise 10 to 20 panels 102, each having dimensions of about 0.6 m by 0.45 m. Each panel 102 may comprise about 2000 elements 108, 110.

Figure 2:
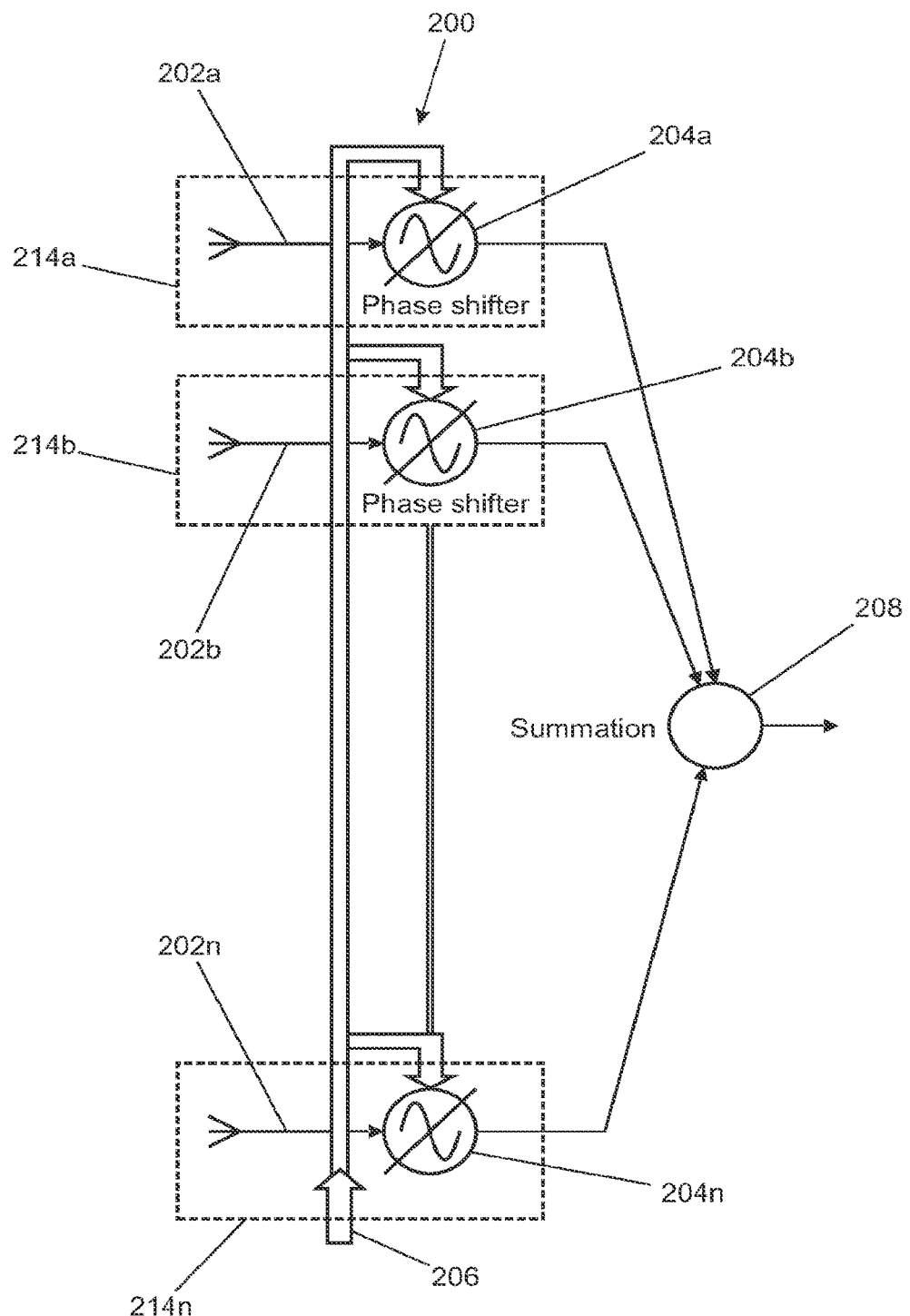
FIG. 2 shows a communications system according to another embodiment of the invention.

FIG. 2 shows a schematic illustration of a phased array antenna panel 200 according to another embodiment of the invention for phase aligning signals received at a plurality of antenna elements 214a-n.

Each antenna element 214 comprises an aerial/antenna 202 and a controllable variable local oscillator 204 configured such that the phase of the local oscillator 204 can be shifted in response to a phase data control signal 206.

The phase data control signal 206 may be generated by hardware or software local to each element 214, or may be generated at a central location, for example by the central controller 104 shown in FIG. 1.

The aerials 202 and the variable local oscillators 204 are configured such that the output signal of a variable local oscillator 204 is mixed with the output signal received at the corresponding aerial 202 in order to generate a baseband signal which is made up of the data signal plus noise. In this embodiment, one step modulation is used, although it will be appreciated that in other embodiments intermediate frequency signals may be generated as part of the demodulation process, and the phase data control signal 206 may be applied to control oscillators 204 that are configured to down convert the received communications signals to intermediate frequency signals.

The baseband signals generated by the antenna elements 214 are provided to a summation component 208 which acts as a common load.

The summation component 208 is arranged to add the baseband signals, and the resultant output signal provides a stronger data signal than the individual component signals as the effect of noise components that may be present in the signals received by the individual elements 214 is reduced. The noise component of the signal received at each element may not be the same and therefore will not be reinforced by the summation component 208.

In order to provide maximum overall gain, the local oscillator 204 of each element 214 should be phase aligned with the component signal received at its associated aerial 202, or at least sufficiently phase aligned such that the element 214 provides the correct output signal. The output signal of an element may be deemed "correct" if it is the same as the output signal of other elements. As described above in relation to FIG. 1, the relative phase of the received component signals can be different for different antenna elements 214 due to differing path lengths between the data source (satellite) and the phased array antenna elements 214.

In order for each antenna element 214 to output the correct output signal, the relative phase of each local oscillator 204 is shifted in accordance with the control signal 206 until the antenna element outputs the same output signal as the other elements 214.

The phase of each of the local oscillators 204 can be adjusted independently of the other local oscillators 204 in accordance with the control signal 206.

It will be appreciated that the different path-lengths between the data source (satellite) and the phased array antenna elements 214 also causes a time delay to be introduced between the signals received at each of the elements 214. In this embodiment, the time delay does not significantly affect the performance of the phased array antenna panel 200 as described below, although in other embodiments time delay components may be used to temporally align the received signals.

The baseband signals represent a digital sequence of +1's and −1's. In this example, the chip/data symbol rate of the received signal is 27.5 Mcps (megachips per second). Using an approximation of the speed of electromagnetic radiation of $3 \times 10^8$ ms$^{-1}$, this means that each chip will have a signal length of about 11 m ($3 \times 10^8/27.5 \times 10^6$). This is at least an order of magnitude greater than the dimensions of the panel 200, which may be 0.6 m by 0.4 m for example. Therefore, for the majority of the time the signals received at each of the elements in a phased array antenna panel relate to the same chip/data symbol.

In this embodiment, any discrepancies between the chip/data symbol that is represented by the signals received at the different elements is considered as insignificant when summing and decoding the simultaneously received signals due to the small proportion of the time that the signals represent different chips/data symbols.

Similarly, when transmitting a signal to a given target (for example, a satellite) the phase shifts applied to each variable local oscillator 204 associated with the elements 214 are set at the same values as those determined for a corresponding receiver to provide a beam of improved gain and signal to noise ratio.

It will be appreciated that by individually controlling the phase shift applied to a local oscillator of each of the plurality of elements 214 associated with the phased array antenna panel 200, a beam of maximum gain (and therefore maximum signal-to-noise ratio) can be focused in a desired direction. The effective radiation pattern of the array can be reinforced in a desired direction and suppressed in an undesired direction.

In this embodiment the received signals are decoded individually by Application Specific Integrated Circuits (ASICs) associated with each element 214 before they are provided to the summation component 208. In such embodiments signal transmission across the phased array panel is at baseband frequency. In other embodiments, the received signal is converted down to an intermediate frequency by an ASIC associated with each element 214 and decoding of the intermediate frequency signals down to baseband frequency is performed centrally at a receiver component (not shown) downstream of the summation component 208. In such embodiments, signal transmission across the phased array panel is at microwave frequency, subject to attenuation and inaccuracy.

Figure 3:
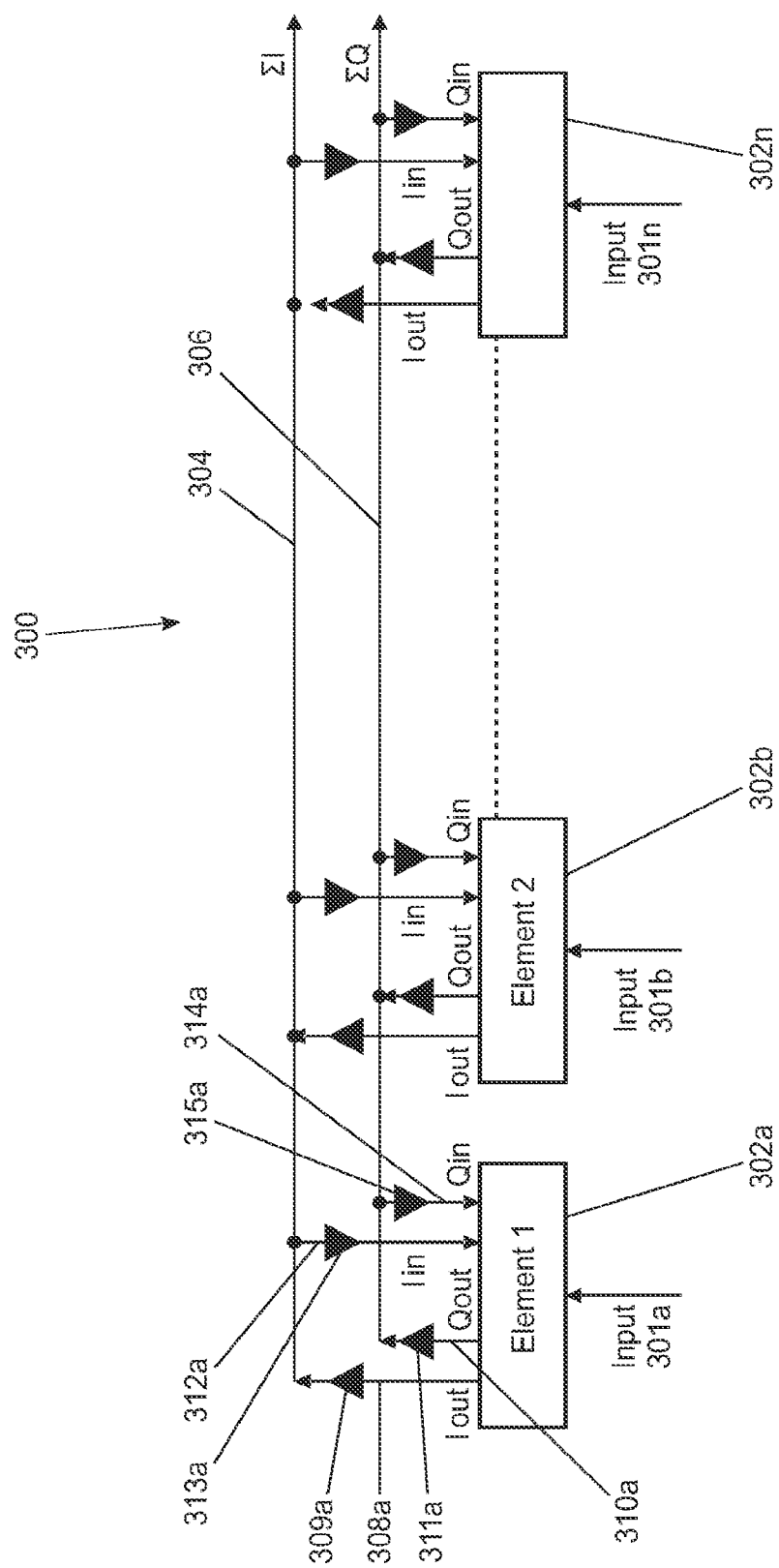
FIG. 3 shows a component diagram of a phased array panel according to another embodiment of the invention.

FIG. 3 shows a Quadrature Phase Shift Keying (QPSK) phased array antenna system 300 comprising a plurality of elements 302, each of which receive a communications signal 301 and are coupled to a differential in-phase output bus 304 and a differential quadrature phase output bus 306. Signals on the differential in-phase and quadrature phase output buses 304, 306 represent the composite of the in-phase and quadrature phase output signals of the elements 302, and are used by each element 302 to generate the phase data control signal 206 shown in FIG. 2.

The in-phase output baseband signal $I_{out}$ 308 and quadrature phase output baseband signal $Q_{out}$ 310 of each element 302 are coupled to the differential output baseband buses $\Sigma I$ 304 and $\Sigma Q$ 306 respectively such that the signal on the differential in-phase baseband bus 304 provides a signal representative of the composite of all of the in-phase baseband signals 308, and the signal on the differential quadrature phase baseband bus 306 provides a signal representative of the composite of all of the quadrature phase baseband signals 310.

The signal representative of the composite value of the in-phase component on the differential in-phase baseband bus 304 is provided as an input signal $I_{in}$ 312 to each element 302, and the signal representative of the sum value of the quadrature phase component on the differential quadrature phase baseband bus 306 is provided as an input signal $Q_{in}$ 314 to each element 302. Each element 302 then internally generates its own phase control signal using the composite baseband signals I.sub.in and Q.sub.in and its respective output signals $I_{out}$ and $Q_{out}$.

The signals on the output buses 304, 306 comprise a superposition of current signals output by the elements 302.

In embodiments where the signals on the output buses represent baseband signals, the superposition of the baseband signals may provide an indication of the average value of the output baseband signals, the polarity of which provides an indication of whether the majority of the individual elements are generating a +V or −V as an output.

In embodiments where the signals on the output buses represent phase modulated intermediate frequency (IF) signals, the superposition of the IF signals may provide an indication of the symbol represented by the majority of the IF signals. For example an IF signal may comprise a positive or negative sine wave (sine waves that are 180 degrees out of phase with each other) representative of a positive or negative baseband symbol (for example +1 and −1), and the composite IF signal may provide an indication of whether the majority of the individual elements are generating a positive or negative sine wave.

As an example, if one hundred elements are coupled to the output bus, and eighty of those elements provide a baseband output signal with a positive current and the remaining twenty elements provide a baseband output signal with a negative current, the superposition of the one hundred baseband current signals on the output bus will provide a composite signal representative of a positive current. This composite signal can be used by each of the elements as an indicator of what the baseband output of that element should be. The signal on the output bus may be considered as an indication of the most common output signal at that time for the phased array antenna as a whole.

The signals on the differential in-phase and quadrature phase output buses 304, 306 may be considered as "consensus signals" as they provide an indication of the signals output by a plurality of elements 302 in order to bring the output of individual elements into concordance/harmony with the other elements in the phased array antenna.

In this embodiment, the phase data control signals that are provided to respective local oscillators associated with each element 302 are generated as a consequence of processing performed by the element 302 to compare the values of the in-phase and quadrature phase output signals on the data buses 304, 306 with the elemental quadrature phase and in-phase output signals, and generating an analogue feedback signal representative of that comparison.

When applying the analogue feedback signal to set the relative phase that should be applied to Element 1 302a, Element 1 302a is considered as a first antenna element, and each of the elements Element 2 302b to Element N 302n are considered as second antenna elements. Signals received at the second antenna elements are used when determining the phase shift that is applied to the first antenna element.

Similarly, when applying the analogue feedback to Element 2 302b, it is Element 2 302b that is considered as the first antenna element and all of the other elements are considered as the second antenna elements, and so on. It will be appreciated that each of the antenna elements 302 can be considered as a first antenna element when determining the phase shift that should be applied to that antenna element 302 as a function of signals received at each of the other, second, antenna elements.

Figure 4:
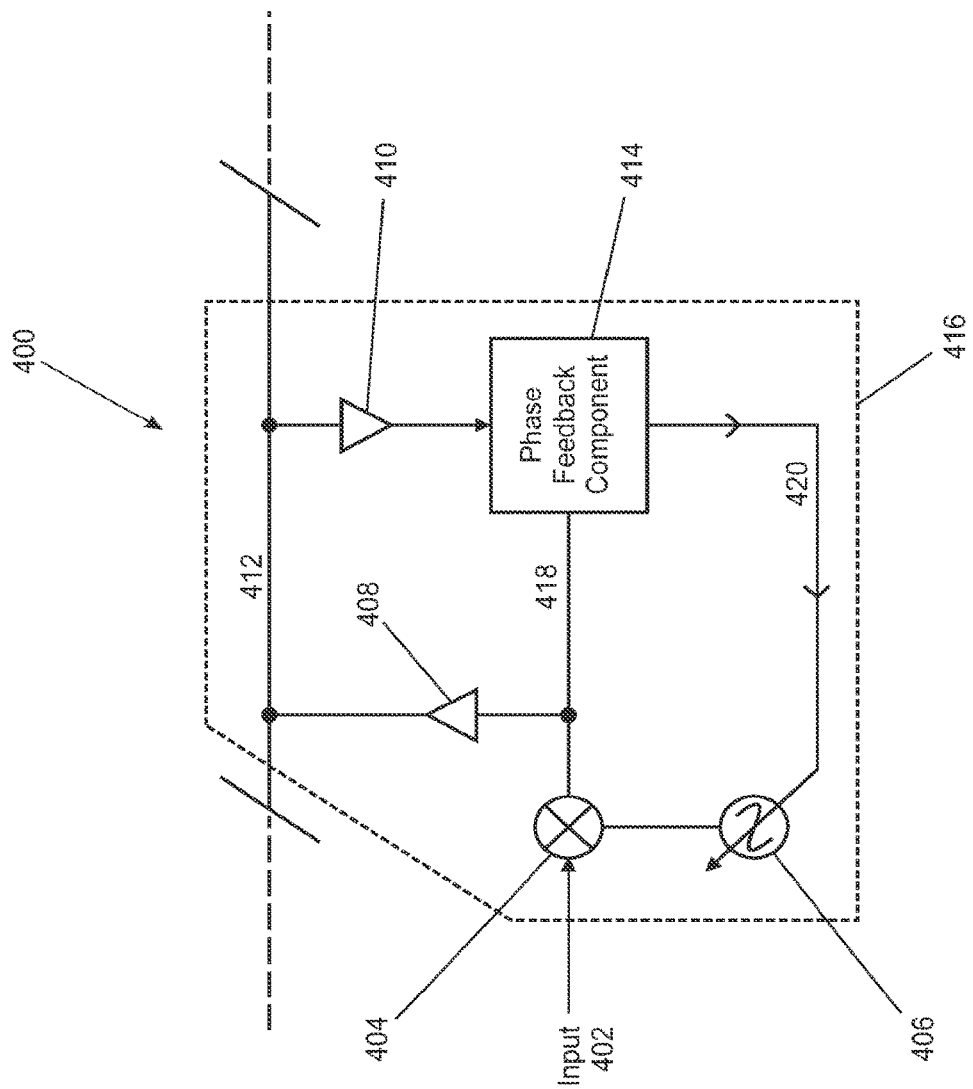
FIG. 4 shows a circuit diagram associated with a phased array element according to another embodiment of the invention.

FIG. 4 shows a schematic diagram of a circuit 400 associated with an element 416 in a phased array antenna system according to another embodiment of the invention. The circuit 400 is configured to automatically adjust the phase shift of a local oscillator 404 based on signals received at one or more other elements in the same phased array antenna system.

The circuit of only one element is shown in FIG. 4 in order to aid clarity, however it will be appreciated that further elements having similar circuits are also connected to the output bus 412 by their own output amplifier and input amplifier in the same way as the circuit 400 shown in FIG. 4.

The circuit 400 comprises a mixer 404, an output amplifier 408, an input amplifier 410, a phase feedback component 414 and a variable phase local oscillator 406. The circuit 400 is configured to receive an input signal 402, and is connected to an output bus 412 by the output amplifier 408 and the input amplifier 410.

The input signal 402 is obtained either directly or indirectly from an aerial/antenna associated with the element 416 and is provided to the mixer 404 as is the output of the variable phase local oscillator 406. The frequency of the local oscillator 406 is set in accordance with the known frequency of the signal being received/transmitted by the phased array antenna system. In this embodiment, the phase of each local oscillator 406 is initially set as an arbitrary value.

The output of the mixer 404 is coupled to a common load/output bus 412 by output amplifier 408. Also coupled to the load/output bus 412 is the output of corresponding mixers associated with other elements in the same phased array antenna system. The common load output bus 412 performs the same function as the common in-phase and quadrature phase baseband buses 304, 306 described in relation to FIG. 3 for providing a signal representative of signals generated by all of the elements.

The signal on the common load/output bus 412 is coupled back to the phase feedback component 414 by input amplifier 410, where it is compared with the individual output signal 418 of that specific element 416. The output signal 420 of the phase feedback component 414 is used as a phase control signal 420 to control the phase of the local oscillator 406 to shift the phase of the local oscillator 406 relative to its respective input communications signal 402, in order to improve the gain of the phased array antenna system.

If the signal on the output bus 412 is different to the individual output signal 418, or represents a different value/data symbol, this provides an indication that the phase of the local oscillator 404 is not correct and that the relative phase of the local oscillator 404 should be adjusted. If the signal on the output bus 412 is the same as the individual output signal 418, or represents the same value/data symbol, this provides an indication that the phase of the local oscillator 404 is correct and does not need to be adjusted.

In this way, the phase of a local oscillator 406 relative to other local oscillators 406 can be adjusted to improve the phase alignment of individual elements in relation to the other elements in the same phased array antenna system to improve the overall signal-to-noise ratio of the phased array antenna system.

For a given frequency, this embodiment of a phased array antenna system automatically shifts the relative phase of the oscillators associated with each of the elements 416 until they produce the same output signal (or an intermediate signal representative of the same output signal) to account for the different path lengths between the data source (such as a satellite) and the individual elements 416, and thereby automatically focuses the phased array antenna onto the source that has the strongest signal at the given frequency. In this way, the phased array antenna system automatically locks on to the source that has the strongest signal at the given frequency, as the phase shift of each element is adjusted to provide a beam which focuses on the signal from the source that provides the strongest signal received at the phased array antenna system. As the phase shift of local oscillators associated with individual elements are adjusted over time, the phased array antenna becomes focused on the source and the overall gain of the phased array antenna increases and the signal-to-noise ratio improves.

It will be appreciated that elements located on the same and/or different phased array antenna panels may be part of the same phased array antenna system, and therefore may be coupled to the same common load/output bus 412.

In this embodiment, the phase control signal 420 is generated by processing performed locally on an Application Specific Integrated Circuit (ASIC) associated with each element 416.

Figure 5:
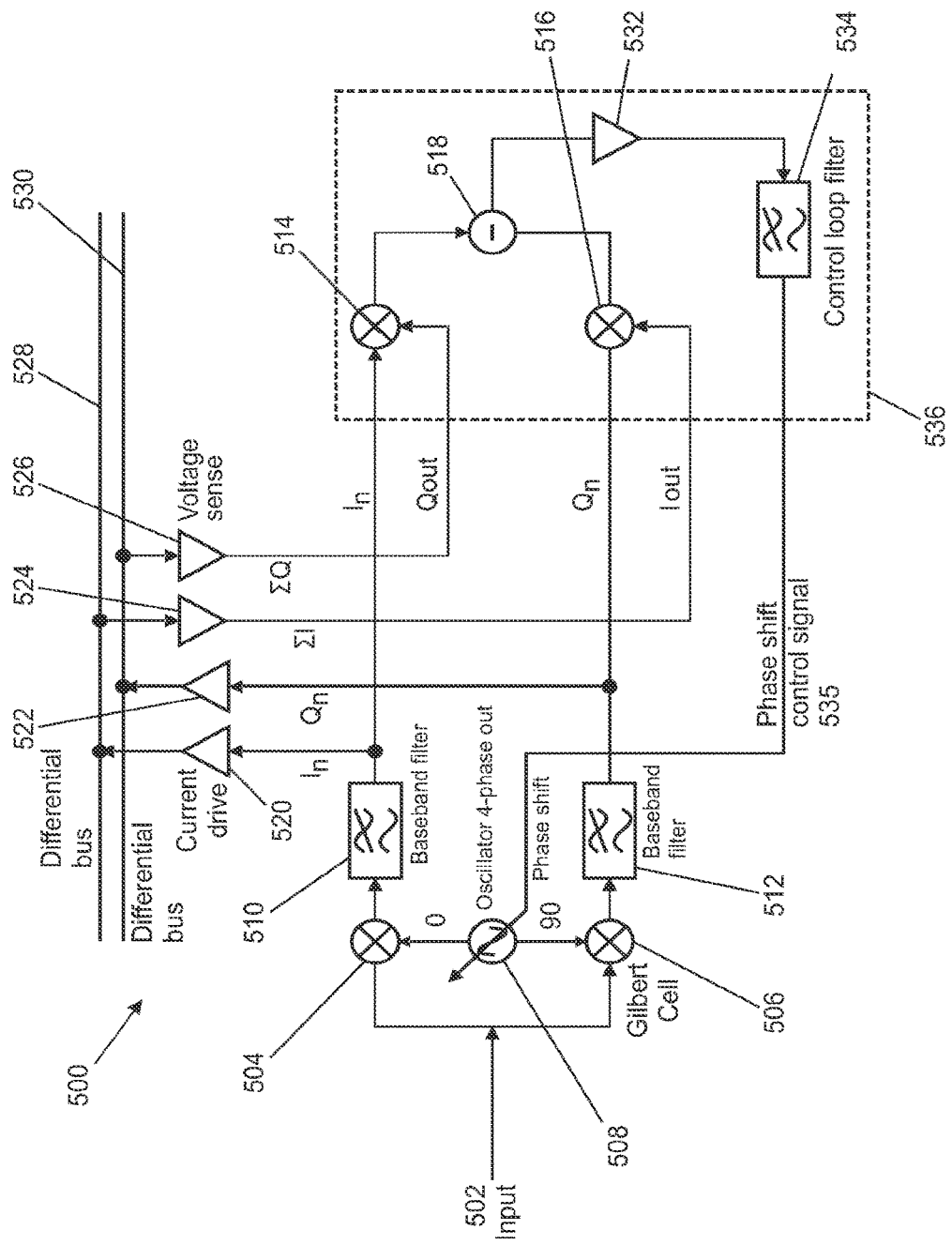
FIG. 5 shows a circuit diagram associated with a phased array element according to another embodiment of the invention.

FIG. 5 shows schematically a circuit diagram of a receiver 500 associated with an element of a phased array antenna system according to another embodiment of the invention. The receiver shown in FIG. 5 is configured to receive a Quadrature Phase Shift Keyed (QPSK) communications signal.

The circuit 500 comprises an in-phase mixer 504 and a quadrature phase mixer 506, a variable quadrature-phase local oscillator 508, an in-phase baseband filter 510 and a quadrature phase baseband filter 512, an in-phase output amplifier 520 and a quadrature phase output amplifier 522, an in-phase input amplifier 524 and a quadrature phase input amplifier 526, and a phase feedback arrangement of components 536. In this embodiment the phase feedback arrangement 536 is based on a Costas loop and comprises two comparison mixers 514, 516, a subtraction component 518, an amplifier 532 and a low-pass control loop filter 534.

The phase feedback arrangement of components 536 is an example of a phase locked loop wherein the phase shift control signal 535 output by the control loop filter is used as a control signal for the voltage controlled local oscillator 508 to bring the baseband output signals $I_n$, $Q_n$ of the element 500 into conformity with the composite output signals $I_{out}$, $Q_{out}$ on the output buses 528, 530. The composite output signals $I_{out}$, $Q_{out}$ provide an external reference signal as part of the feedback path.

A received communications signal 502 is provided as "Input", which is provided either directly or indirectly from an aerial/antenna (not shown) associated with the element. The circuit comprises an in-phase and quadrature phase output bus 538, 530 respectively to which the output of the element receiver circuit 500 is coupled.

It will be appreciated that the phased array antenna system comprises a plurality of elements, as shown in FIG. 3 for example, each having a corresponding receiver circuit. Each of the plurality of receiver circuits are coupled to the in-phase and quadrature phase output buses 538, 530 in the same way as the receiver circuit 500 shown in FIG. 5, and the additional receiver circuits are not shown in FIG. 5 to aid clarity.

The input signal 502 is provided to both the in-phase mixer 504 and the quadrature phase mixer 506. In this embodiment, the mixers 504, 506 are Gilbert cells. Also provided as an input to each mixer 504, 506 is an output signal of the quadrature-phase local oscillator 508.

The quadrature-phase local oscillator 508 is configured to provide two signals having the same frequency and amplitude: one of which is 90° out of phase with the other signal. The in-phase output signal from the local oscillator 508 is provided to in-phase mixer 504 and the quadrature phase output signal from the local oscillator 508 is provided to quadrature phase mixer 506. The output of in-phase mixer 504 should be the in-phase component of the input signal 502, and the output of quadrature phase mixer 506 should be the quadrature phase component of the input signal 502.

If the relative phase of the local oscillator 508 is not sufficiently aligned with the phase of the received input signal 502 there will be an element of the in-phase component signal in the output signal generated by the quadrature phase mixer 506, and vice versa. It is an aim of this embodiment of the invention to control the phase of the local oscillator 508 to reduce and/or minimize the cross-contamination of the in-phase and quadrature phase components thereby improving the efficiency of the associated phased array antenna system.

Each of the in-phase component and the quadrature phase component signals are provided to in-phase and quadrature phase low-pass baseband filters 510, 512 respectively. The baseband filters 510, 512 are configured to remove any unwanted frequency components from the signals, such as "sum frequency" components generated by the mixers 504, 506 and also to reduce noise by removing signals that are outside the baseband frequency.

The output signal of in-phase baseband filter 410 is the in-phase baseband signal for the element, and is identified as $I_n$. $I_n$ is coupled by in-phase output amplifier 520 to the differential in-phase output bus 528 identified as $I_{out}$. In this embodiment the in-phase output amplifier 520 is a current drive amplifier.

Similarly, the output signal of quadrature phase baseband filter 512 is the quadrature phase baseband signal for the element, and is identified as $Q_n$. $Q_n$ is coupled by quadrature phase output amplifier 522 to the differential quadrature phase output bus 530 identified as $Q_{out}$. In this embodiment the quadrature phase output amplifier 522 is also a current drive amplifier.

The current drive amplifiers 520, 522 provide a switched current source across a pair of resistors on to the output buses 528, 530. In this embodiment, the baseband output signal represents a series of +1's and −1's, and therefore the current drive amplifiers 520, 522 source either a positive or negative current onto the output buses 528, 530.

Each of the N elements that form part of the phased array antenna are connected to the output buses 528, 530 by corresponding amplifiers 520, 532 such that the resulting voltage that is provided on an output bus 528, 530 is the sum of all of the currents provided as an output from the individual elements multiplied by all of the coupling resistors in parallel:

$$v(t) = \sum_{n=1}^{N} (i_n(t)) * (R/N)$$

Where N is the number of elements coupled to the output bus, and R is the resistance of the pair of resistors that couple the elements to the output bus. The in-phase baseband signal $I_n$ is also provided to a first comparison mixer 514 along with the composite value of the quadrature phase baseband signal $Q_{out}$. $Q_{out}$ provides a representation of the polarity of the quadrature phase baseband signal that is a composite of the output of all of the elements in the phased array antenna system.

When the Input signal 502 is converted down to the baseband component signals, the in-phase and quadrature phase components should be completely independent of each other as they will be randomly different. A significant amount of work has gone into ensuring that the in-phase and quadrature phase components are independent of each other, for example through the use of Reed-Solomon coding. That is, there should not be any correlation between the in-phase and quadrature phase component signals when they are compared with each other if the local oscillator 508 is configured with the correct phase alignment. If there is a degree of correlation between the in-phase and quadrature phase components then this provides an indication that there is a representation of the in-phase component contaminating the quadrature phase component and/or vice versa.

In the present embodiment, the in-phase and quadrature phase baseband signals comprise QPSK symbols (chips) having (in-phase, quadrature) values of either (1,1), (1,−1), (−1,1) or (−1,−1). Therefore the instantaneous product of the in-phase and quadrature phase components can be either 1 or −1. There is a statistically equal chance of the output being 1 or −1.

If the in-phase and quadrature phase components are unrelated then the sum of the product of the two components generated by first comparison mixer 514 over time will be zero as there will be an equal number of values of '1' and '−1'. The time averaging of the products of the two components is calculated by the control loop filter 534 as described below. That is, the time-averaged multiplication of the in-phase and quadrature phase components will be zero if the two components are uncorrelated.

If the time-averaged multiplication of the in-phase and quadrature phase components is not zero, then this provides an indication that there is cross-contamination between the in-phase and quadrature phase components and therefore the relative phase shift of the local oscillator 508 is not correctly aligned for the received Input signal 502.

The second comparison mixer 516 is configured in a similar way to the first comparison mixer 514, but is configured to multiply the element quadrature phase component signal $Q_n$ by the composite in-phase component signal $I_{out}$. Again, a non-zero time averaged output of the second comparison mixer 516 provides an indication that there is cross-contamination between the in-phase and quadrature phase components and therefore an indication that the local oscillator 508 is not correctly phase-aligned.

In some embodiments, use of a second comparison mixer is not required as the feedback provided by the first comparison mixer 514 may provide sufficiently accurate information in relation to the degree of correlation between the in-phase and quadrature phase component signals. In this embodiment, the second comparison mixer 506 is used to provide an additional measure of the degree to which the in-phase and quadrature phase components are correlated.

The output signals from the two comparison mixers 514, 516 are provided to a subtraction component 518, where the difference between the signals is generated and provided as the output of the subtraction component 518.

Use of the subtraction component 518 enables the effect on the resultant phase shift control signal 535 of any unwanted signals that are present in both the in-phase and quadrature phase components to be reduced, as the unwanted signals can cancel each other out when the two output signals of the comparison mixers 514, 516 are subtracted. This can help to reduce any distortion caused by the circuit 500.

For example, any offset signals in the received in-phase and quadrature signals may tend in polarity and voltage in opposite directions and therefore are cancelled out when they are mixed together by the comparison mixers 514, 516 and subsequently subtracted by the subtraction component 518. Such offset signals may be caused by the physical surroundings of the circuit 500, and in this embodiment the offset signals can be particularly reduced if the comparison mixers 514, 516 are identical components and they are physically located close to each other.

The signal at the output of the subtraction unit 418 is provided to an amplifier 432, the output of which is provided to a low-pass control loop filter 434. The low-pass control loop filter 434 effectively time-averages/integrates the signal that is generated by the subtraction unit 518 by removing short term oscillations and leaving the long-term (low frequency) trend. Short term oscillations in the signal generated by the subtraction unit 518 may be caused by the statistically short period of time that the signal received at each of the elements relates to a different data symbol.

A non-zero output of the low-pass control loop filter 434 provides an indication that the phase alignment of the local oscillator 508 is not optimal as there is a cross-contamination between the in-phase and quadrature phase component signals.

The signal at the output of the low-pass control loop filter 434 is used as a phase shift control signal 535 that is configured to control the phase shift of the quadrature-phase local oscillator 408. A non-zero value of the phase shift control signal 535 causes the relative phase of the local oscillator 508 to be adjusted in order to further reduce the value of the phase shift control signal 535 if possible. If the phase shift control signal 535 is zero, the relative phase of the local oscillator 508 is not adjusted.

This phase feedback arrangement 536 is derived from a Costas loop and is configured as a phase alignment tool. When the phased array antenna panel is considered as a whole, the phase feedback system can be considered as a plurality of Costas Loops applied in parallel.

Optionally, the signal provided on the output buses $I_{out}$ and $Q_{out}$ may be a composite signal of a subset of the output signals of all of the elements in the phased array antenna system, for example the elements in a specific phased array antenna panel, or a region of a phased array antenna panel.

In other embodiments, a single low-pass control loop filter 534 may be provided for more than one element, for example a single low-pass control loop filter 534 may be provided for all of the elements on a phased array antenna panel. That is, the signal that is output by amplifiers 532 associated with each of the elements 500 are provided as inputs to the low-pass control loop filter 534. In such embodiments the noise in the system is reduced as noise component signals experienced by each of the individual elements have a reduced effect when processed with the signals received at other elements. In further embodiments still the low-pass control loop filter 534 may be a stand-alone filter for each of the elements 500.

In further embodiments still, the phase feedback arrangement 536 may comprise components configured to compare the $I_n$ signal with the $I_{OUT}$ signal and/or the $Q_n$ signal with the $Q_{OUT}$ signal to identify any non-correlation between the signals as an indication of cross-contamination between the in-phase and quadrature phase signals of the input signal 502. That is, if the elemental output signal is not the same as, or close enough to, the composite output signal of all of the elements, then the demodulation of the communications signal received at that element may be determined as suboptimal.

Once each element is aligned it may maintain the required phase relationship between the local oscillator 508 and the received communications input signal 502 that is necessary to align its local constellation with the consensus constellation on the output buses 528, 530. The phase array antenna is assumed to be small in relation to the velocity of light/data symbol period.

It will be appreciated that in other embodiments the frequency of the local oscillator may be set so as to down convert the input signal 502 to an intermediate frequency signal. In such embodiments the signals that are coupled onto the output buses 528, 530 are intermediate frequency signals representative of a data symbol. For example, a +1 and −1 data symbol at baseband may be represented as a + sine and − sine wave respectively at intermediate frequency. The direct current (dc) equivalent embodiment may be considered as a sine wave with zero frequency.

In embodiments working at intermediate frequency, the circuit illustrated in FIG. 5 works in the same way by adjusting the phase of the local oscillator 508 such that the intermediate frequency signal generated by an element represents the same data symbol as the intermediate frequency signals generated by the other elements as provided on the output buses 528, 530.

The local oscillator 508 of a first element may be locked to the local oscillators 508 associated with the other second elements. For example, the local oscillators 508 in the down converters may be replaced by one signal generator and a signal splitter. Each element may have an intermediate frequency/demodulation integrated circuit associated with it. One of the integrated circuits may have a crystal oscillator and the other integrated circuits may be slaved to that crystal oscillator.

Figure 6:
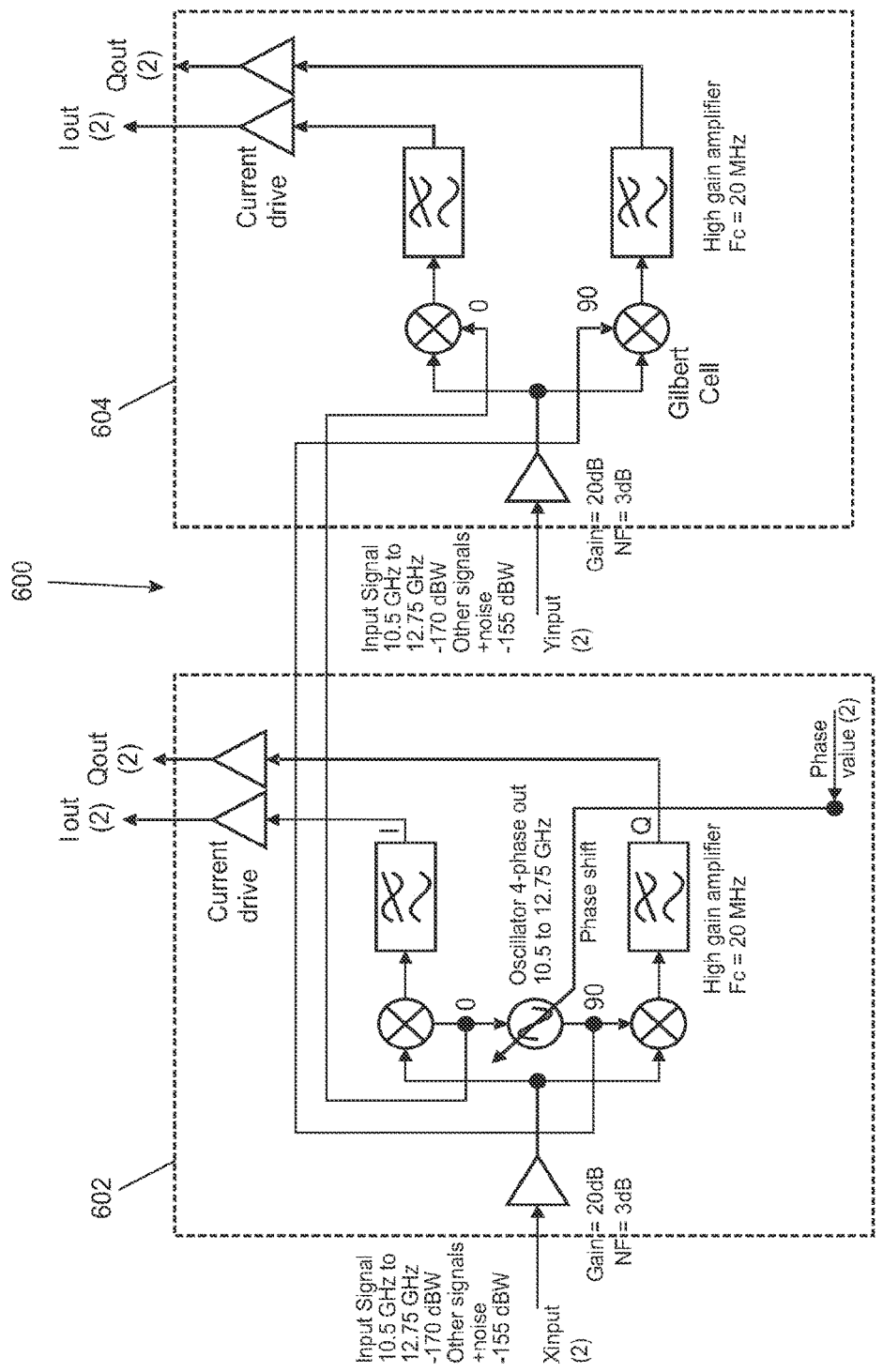
FIG. 6 shows a circuit diagram associated with a phased array element according to another embodiment of the invention.

FIG. 6 shows schematically another embodiment of a receiver 600 associated with an element of a phased array antenna system according to an embodiment of the invention.

In this embodiment, the element comprises two receivers: an X-receiver 602 for receiving signals that are polarized in an X direction; and a Y-receiver 604 for receiving signals that are polarized in a Y direction, which is perpendicular to the X direction.

Each of the receivers 602, 604 may be similar to the receiver described in relation to FIG. 4 or FIG. 5, and the phase feedback elements are not shown in FIG. 6 to aid clarity.

Processing signals in two perpendicular components/dimensions can provide greater control, particularly when transmitting data, of the phased array antenna system as discussed in more detail below.

In this embodiment, each of the input and output ports are differential ports.

Figure 7:
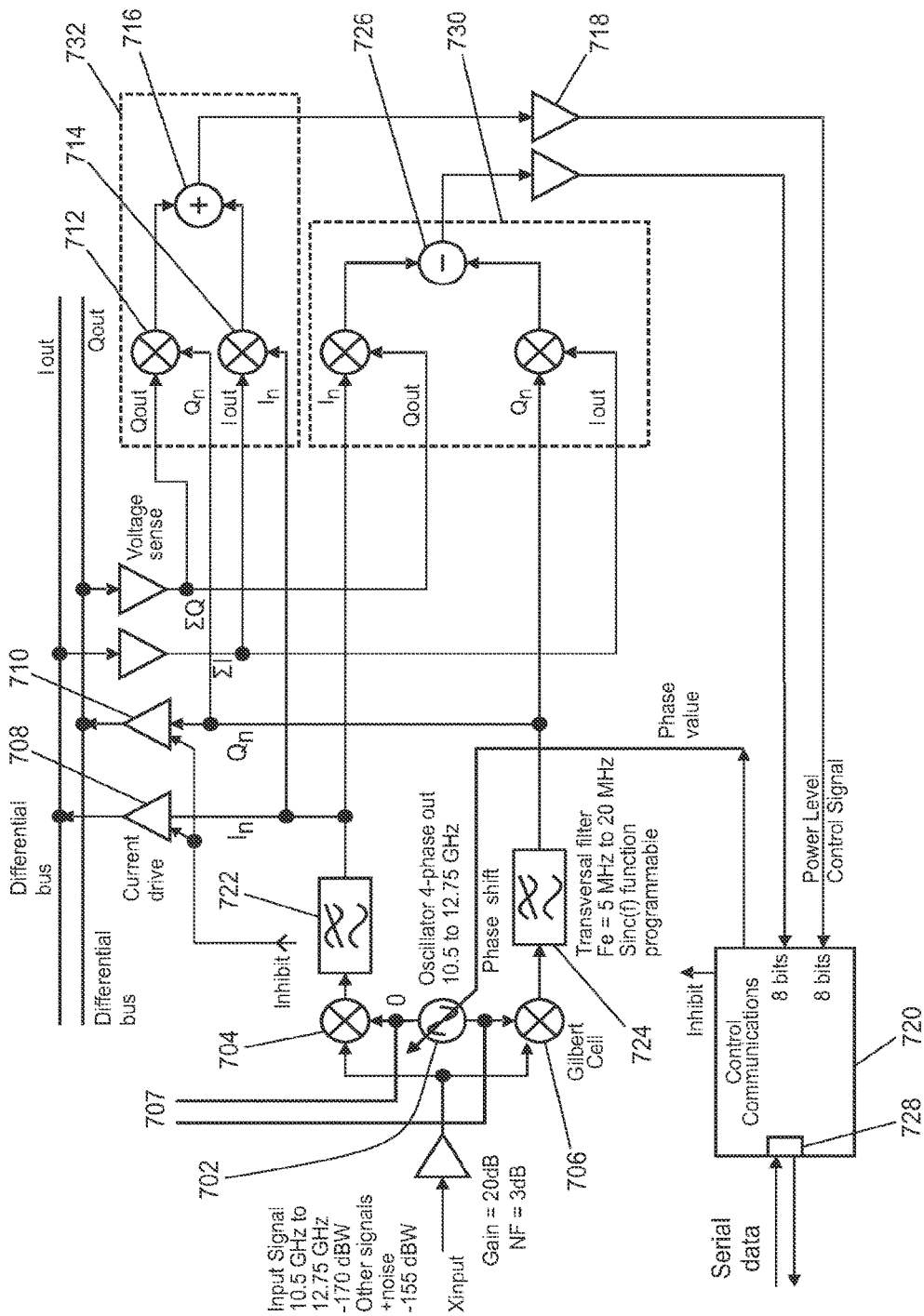
FIG. 7 shows a circuit diagram associated with a phased array element according to another embodiment of the invention.

FIG. 7 shows schematically a receiver 700 of an embodiment of the invention that is configured to receive signals that are polarized in the X direction. A corresponding receiver that is configured to receive signals that are polarized in the Y direction is not shown in FIG. 7. The receiver 700 is similar to the receiver 400 of FIG. 4, and common components that have already been described in relation to FIG. 4 will not be described again here.

As in FIG. 4, the two output signals of the quadrature-phase local oscillator 702 are provided to mixers 704, 706 in the X-receiver 700. In addition, the two output signals are also provided to the corresponding Y-receiver as indicated by arrows 707 that is configured to receive signals that are polarized in the Y dimension.

In this embodiment, the current drive amplifiers 708, 710 that couple the in-phase $I_n$ and quadrature phase $Q_n$ phase components of the output signal of the element are provided with an inhibit functionality. The inhibit functionality is controlled by a control communications component 720 and can be used to control which of the individual elements and/or which of the X and Y direction receivers are used for generating the composite output signals on the output differential buses.

A current drive amplifier 708, 710 for an element may be inhibited by the control communications component 720 if the output signals generated by the element are determined as spurious as determined from a power level control signal as described below. Spurious output signals may be generated if the aerial associated with the element is damaged, obscured or otherwise prevented from receiving and processing an electromagnetic signal from the source (e.g. satellite).

Also, the current drive amplifiers 708, 710 for an element may be inhibited if it is determined that the signal received at that element at that polarity (X or Y direction) is below a threshold. This may be the case if the element 700 happens to be aligned with the satellite such that the majority of the signal received at the element 700 is polarized in line with the element 700.

In addition to the phase feedback arrangement 730 that is similar to the one shown in FIG. 5, a signal level feedback arrangement of components 732 is also provided.

The signal level feedback arrangement 732 comprises first signal level mixer 712, second signal level mixer 714, summation component 716, and amplifier 718, and is configured to provide a feedback signal representative of the signal strength/level of the signal received at the element.

First signal level mixer 712 is configured to multiply the quadrature phase component of the element output signal $Q_n$ by the composite of the quadrature phase component of the output signals of all of the elements in the phased array antenna system $Q_{out}$. The signals $Q_n$ and $Q_{out}$ should be phase aligned (or nearly phase aligned) which will mean that when multiplied together they constructively interfere with each other, and therefore the resultant signal provides an indication of the signal strength of $Q_n$.

Similarly, second signal level mixer 714 is configured to multiply the in-phase component of the element output signal $I_n$ by the composite of the in-phase component of the output signals of all of the elements in the phased array antenna system $I_{out}$.

The output of the two signal level mixers 712, 714 are provided as inputs to the summation component 716, the output of which is provided to the control communications component 820 via amplifier 818 as a power level control signal.

The control communications component 720 is configured to receive the feedback signals in relation to phase from the subtraction component 726 of the phase feedback arrangement 730, and in relation to the power/signal level from the output of the summation component 716 of the signal level feedback arrangement 732 via amplifier 718. The control communications component 720 is configured to process one or more of the received signals in order to generate a signal representative of a phase shift to be applied to the local oscillator 702.

In this embodiment, the control communications component 720 is located on the phased array panel and provided with a serial data input and output port 728 that is configured to communicate with a central controller and/or other phased array antenna panels and/or a user interface.

In some embodiments, the control communications component 720 may be configured to analyze the strength of a signal received at an element relative to the strength of signals received at other elements from the respective power level control signals, in order to apply a weighting to signals received at that element. The weighting may be applied by controlling the gains of current drive amplifiers 708, 710.

Applying a weighting may be used to ensure that the signals received at all of the elements are provided to the differential output buses $I_{out}$, $Q_{out}$ with the same current, and therefore have equal effect. In other embodiments, the gain of the current drive amplifiers 708, 710 can be set by the control communications component 720 in order to deliberately provide an offset weighting to the signals generated by the elements such that signals received at some elements have a greater influence on the composite signal on the output bus than signals received at other elements.

In this embodiment, the phase shift applied to the local oscillator 702 is updated at a rate that is quicker than the orientation of the element can significantly change relative to the satellite with which it is communicating, for example by a train to which the associated phased array antenna panel is attached turning, jolting, etc. The phase shift signal that is applied to the local oscillator 702 may be updated about 1,000,000 times per second (that is, once every 1 μs).

Figure 8:
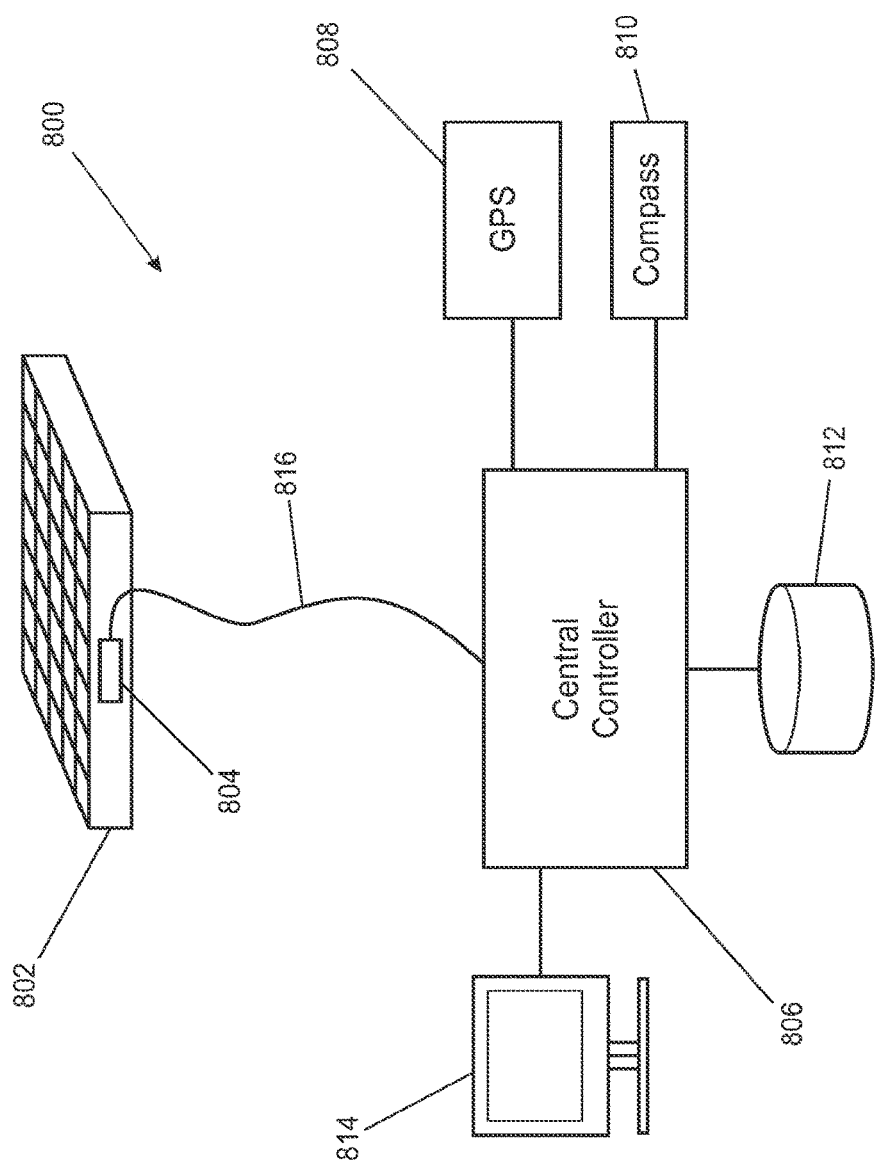
FIG. 8 shows a communications system according to another embodiment of the invention.

FIG. 8 shows a communications system 800 according to another embodiment of the invention.

The communications system comprises a phased array antenna panel 802 and a central controller 806 in communication with each other via a fiber optic cable 816. The central controller 806 is also connected to a global positioning system (GPS) 808, a compass 810, memory 812 and a visual display unit (CPU) 814.

The phased array antenna panel 802 comprises a control communications component 804 which is configured to apply control signals to the circuits associated with the elements of the panel 802. In this embodiment the processing that is required to generate the control signals is performed by the central controller 806 as described below.

When the system 800 is installed or initially configured, a map of the position of the elements of the phased array antenna panel 802 is generated and stored in memory 812. The map consists of a database of three-dimensional coordinates identifying the location of each of the elements relative to a reference point, for example a corner of the phased array panel 802. In addition, three-dimensional coordinates of the panel 802 are stored in memory 812 to enable the location and orientation of the panel 802 to be determined. For example, the coordinates of three corners of the panel 802 may be stored in memory 812 as this can allow the location of any element on the panel 802 to be determined through use of linear interpolation.

The initial values that are stored in memory 812 for the locations of the elements are set according to mechanical measurements that are made of the panel 802, for example using a ruler, protractor etc., and/or from a design specification of the panel 802. For this reason, the initial version of the map may be referred to as a "mechanical map."

As discussed above, using solely mechanical measurements of the panel can lead to inaccuracies if the actual instantaneous mechanical properties of the panel are different to the theoretical/measured properties that are initially stored in memory 812. The actual mechanical properties of the panel can change over time, for example due to thermal expansion and contraction.

The central controller 806 has stored in memory 812 the location of the geostationary satellite with which it is configured to communicate and the frequency of the electromagnetic signals that are sent to, and received from, the satellite.

The central controller 806 is configured to use the information about the location of the satellite along with positional information about the location of the phased array antenna panel 800 as determined from the GPS component 808 and the compass 810 to determine the theoretical difference in phase of the electromagnetic signals received at the different elements. The difference in phase can be calculated using simple mathematics, including basic trigonometry as illustrated in FIG. 1.

A value for the theoretical phase shift that should be applied to the local oscillator associated with each element of the phased array antenna panel 802 is also stored in memory 812. When the communications system 800 is first switched on, or reset, the central controller 806 provides a signal to communications component 804 to apply the theoretical phase shifts to each of the elements.

Over time, as phase shift control signals are returned from the phased array antenna panel 802 to the central controller 806, the original mechanical map of the position of elements stored in memory 812 is updated to more accurately reflect the location of the elements as determined from the phase control signals.

For example, if it is determined that the signal generated by the local oscillator associated with an element should be 5° more than the theoretical phase shift determined from the mechanical map, this may indicate that the actual location of the element is actually 333 μm away from the theoretical value, and the mechanical map is updated with a corrected coordinate for that element. The phase shift control signal is then determined based upon the corrected location of the element.

Automatically updating the initial "mechanical map" of the locations of elements may be referred to as generating an "electrical map" of the locations of elements which reflects what is really there as determined from the in situ operating results.

Use of the mechanical map which can be populated upon installation enables the system to unambiguously identify and lock on to a desired satellite. This is because the mechanical map enables the phase shift applied to each of the local oscillators to be initially set so as to focus the phased array antenna system such that the strongest signal that is received at that frequency is from the desired satellite to the exclusion of other satellites transmitting at the same frequency.

Subsequent use of the electrical map which is maintained by a phase feedback arrangement such as a Costas loop as described above enables the gain and signal-to-noise ratio to be improved for communications with the identified satellite as any mechanical inaccuracies in the panel, or variations in the mechanical properties over time are automatically incorporated into the electrical map.

In this embodiment, the map of the locations of elements can be graphically displayed to a user on the VDU 814. This can enable a user to identify any potential discrepancies in the received data, for example if an element is shown at a position that is clearly inconsistent with the position of the other elements this may indicate that the element is faulty or that the element is obscured from the signals being received by the satellite. In this embodiment, a user can use a user interface (not shown) associated with the VDU 814 to manually inhibit an element that has been identified as providing erroneous results in the same way as described in relation FIG. 7. In addition, or alternatively, the central controller 806 may automatically determine that an element is providing erroneous results if the received signal strength is too low, such as falling below a threshold value, and can automatically inhibit the element responsive to that determination.

In other embodiments a map of the relative phase shifts that are applied to each of the elements may be stored in memory 812 in addition to, or instead of, the map of the coordinates of the locations of elements.

In some embodiments, signals received from individual elements may be particularly susceptible to noise. In order to minimize the effect of noise, the central controller 806 is configured to generate a plane-of-best-fit through the coordinates of each of the locations of the elements and generate phase control signals based upon the locations of the elements as if they were located on the plane-of-best-fit. In such embodiments any elements that have been inhibited, either manually or automatically, may not be considered when generating the plane-of-best-fit as these may skew the results.

Generating the phase control signals in accordance with a pattern generated from the coordinates of a plurality of elements can reduce the effects of noise compared with the effects of noise when considering each element in isolation.

Figure 9:
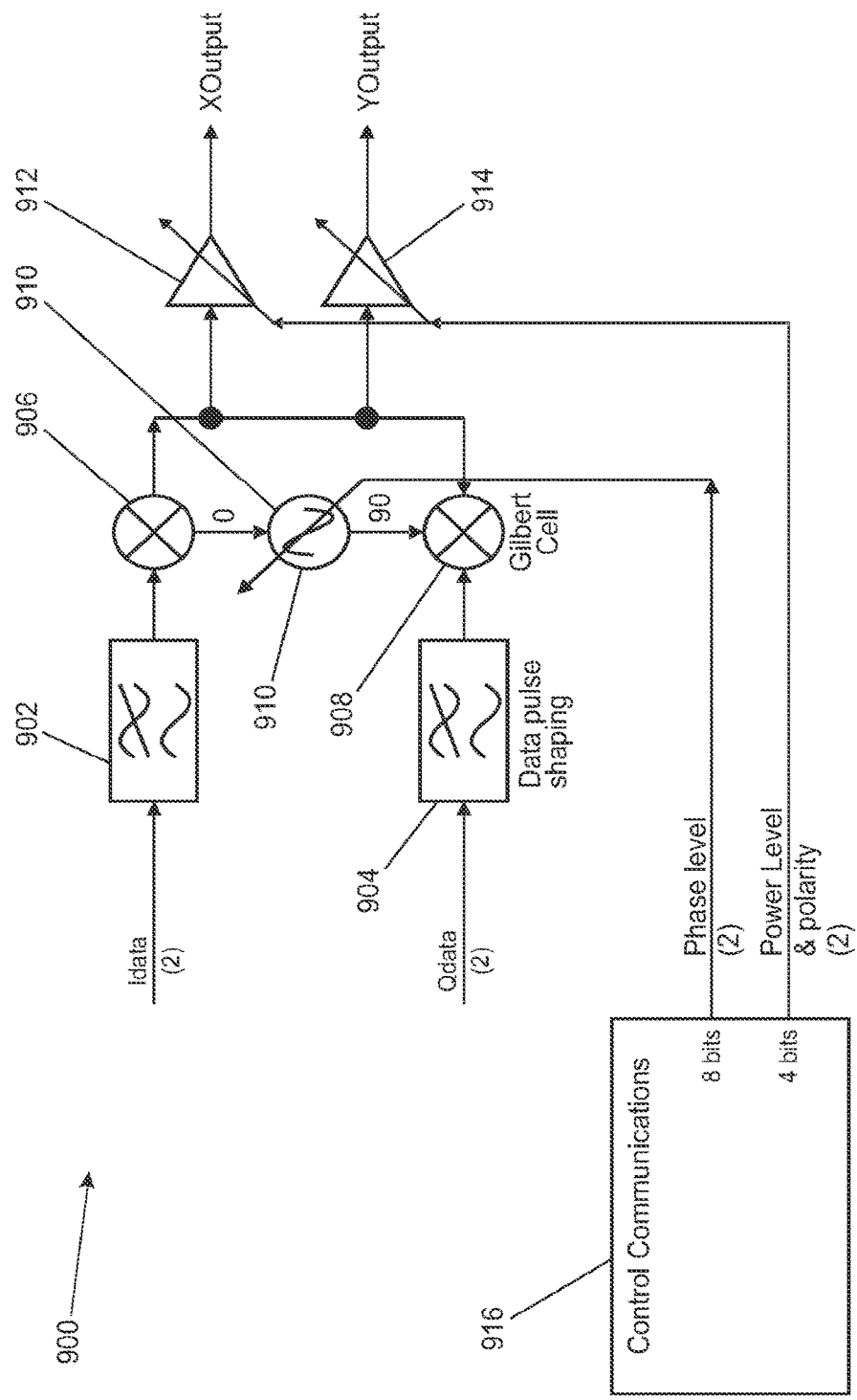
FIG. 9 shows a circuit diagram associated with a phased array element according to another embodiment of the invention.

FIG. 9 shows schematically an embodiment of a transmitter 900 associated with an element of a phased array antenna system. It will be appreciated that a transmitter of an embodiment of the invention can use components of a corresponding receiver circuit, but with the direction of signals reversed. In this embodiment the transmitter circuit 900 can use the same components as the receiver circuit 700 of FIG. 7.

The in-phase component ($I_{data}$) and quadrature phase ($Q_{data}$) component data are provided to lowpass filters 902, 904 respectively for data pulse shaping. The output of the lowpass filters 902, 904 are then mixed with the output of a quadrature-phase local oscillator 910 at mixers 906, 908 respectively. A phase shift applied to the local oscillator 910 is set in accordance with a phase control signal received from control communications component 916. The phase value provided by the control communications component 916 is determined from a receiver associated with the same element of the phased array antenna system according to any of the embodiments of the invention described herein.

The in-phase and quadrature phase component signals are provided to variable amplifiers 912, 914 before being transmitted. The power level and polarity of the variable amplifiers 912, 914 can also be set in accordance with a signal level control signal received from control communications component 916, for example the signal level control signal described in relation to FIG. 7.

In this embodiment, the orientation of the phased array antenna element 900 relative to a satellite can be taken into account when generating the "power level and polarity" signal, in particular by analysis of corresponding received signals in the X and Y directions by the control communications component 720, 916. Alternatively, the orientation of the phased array antenna element 900 can be determined through use of position determination means (such as a compass and GPS as discussed in more detail in relation to FIG. 8).

Control communications component 916 is configured to determine what proportion of the signals received from the satellite are in the X dimension, and what proportion of the signals received from the satellite are in the Y dimension. At one extreme, the phased array antenna element may be exactly aligned with the received signal such that 100% of the signal is received in the X direction and 0% of the signal is received in the Y direction. At the other extreme, 0% of the signal is received in the X direction and 100% of the signal is received in the Y direction.

If it is determined that 100% (or greater than a predetermined threshold) of the received signal is in the X direction, then the Y output amplifier 914 may be inhibited during transmission, and vice versa in order to save power as transmitting a signal in the Y direction may be deemed unnecessary.

Figure 10:
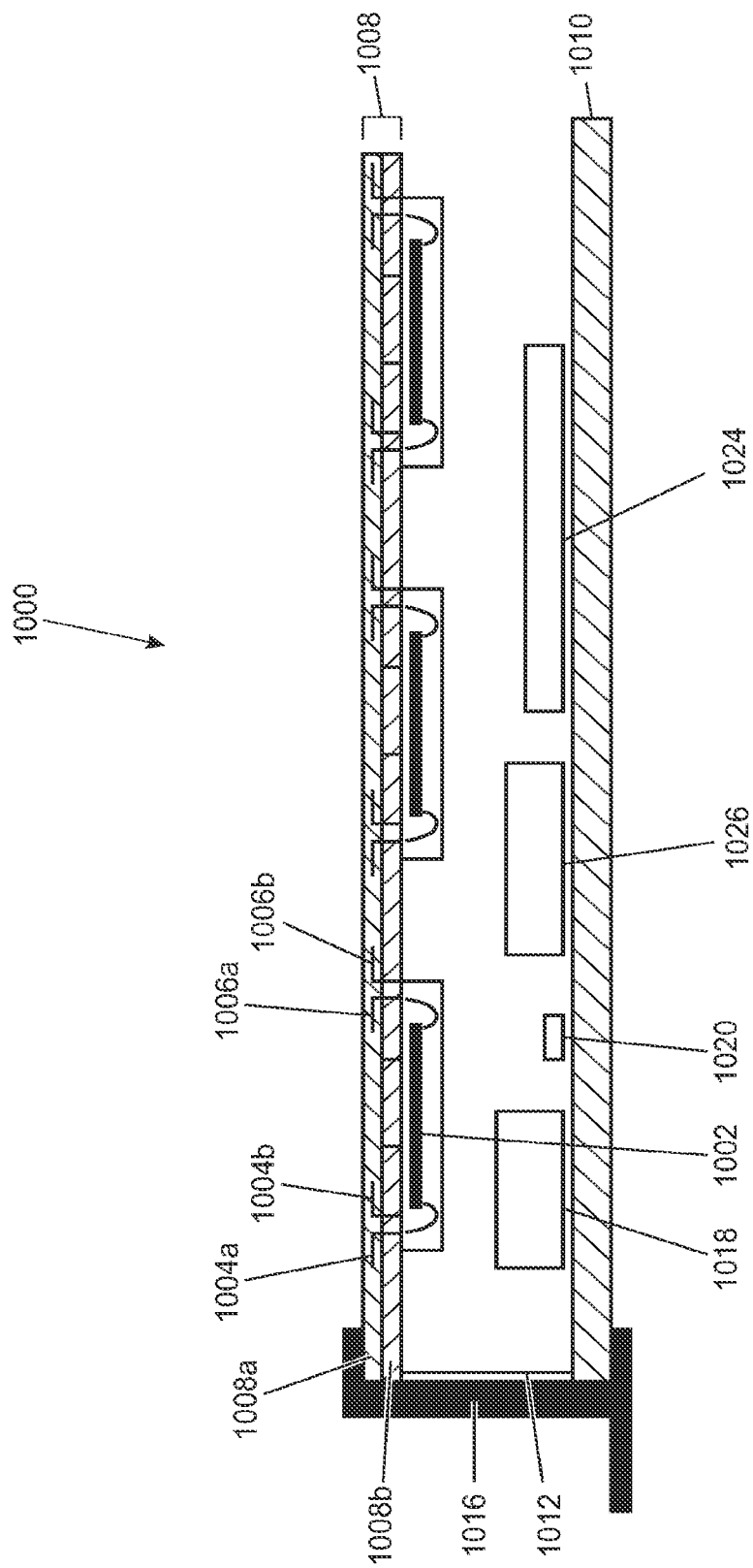
FIG. 10 shows schematically a cross-sectional view of a phased array panel according to another embodiment of the invention.

FIG. 10 shows a cross-sectional view of a phased array antenna panel 1000 according to another embodiment of the invention. The phased array antenna panel 1000 comprises a plurality of phased array antenna elements 1001.

The panel 1000 consists of two boards: a top board 1008 and a bottom board 1010. Each element 1001 is provided on the top board 1008 and consists of a cross-folded dipole antenna 1004, 1006 printed on the upper side of the top board 1008, and an Application Specific Integrated Circuit (ASIC) 1002 mounted on the underside of the top board 1008. The cross-folded dipole antenna has four antennae 1004a, 1004b, 1006a, 1006b. The ASIC 1002 is connected to the antennae 1004a, 1004b, 1006a, 1006b via plated-through holes in the top board 1008.

Each element 1001 has four antennae: two common centroid antennae 1004a, 1004b for receiving data and two common centroid antennae 1006a, 1006b for transmitting data with polarization in the X and Y. X and Y are orthogonal axes in the plane of the panel 1000. The relative amplitudes and polarity detected by the X and Y receivers indicate direction of polarization.

The top board 1008 is multilayer and comprises a top layer 1008a made from high-K loaded PTFE material on the upper side of a ground plane, and a bottom layer 1008b made from glass-fiber reinforced PTFE dielectric.

The elements 1001 are spaced on a 10 mm hexagonal grid, which are less than half the operating wavelength apart in order to reduce the effect of spurious side lobes which are generated by the grating effect. The hexagonal array is a particularly advantageous embodiment for reducing the grating effect. In addition, the geometry of a hexagonal array enables the density of the elements on a panel to be increased compared with known panels, whilst maintaining acceptable working parameters such as a sufficiently low grating effect. Known phased array antenna panels use square and rectangular elements, as it is more convenient to associate waveguides with the elements. However, embodiments of the invention using a hexagonal array of elements can retain the convenience of associating waveguides with the elements as illustrated in FIG. 11, whilst further improving the element density of the phased array antenna panel thereby enabling a beam of maximum gain to be better defined.

In this embodiment, the hexagonal array can enable the phase shifts that are required for each of the local oscillators to be efficiently determined and applied.

Figure 11:
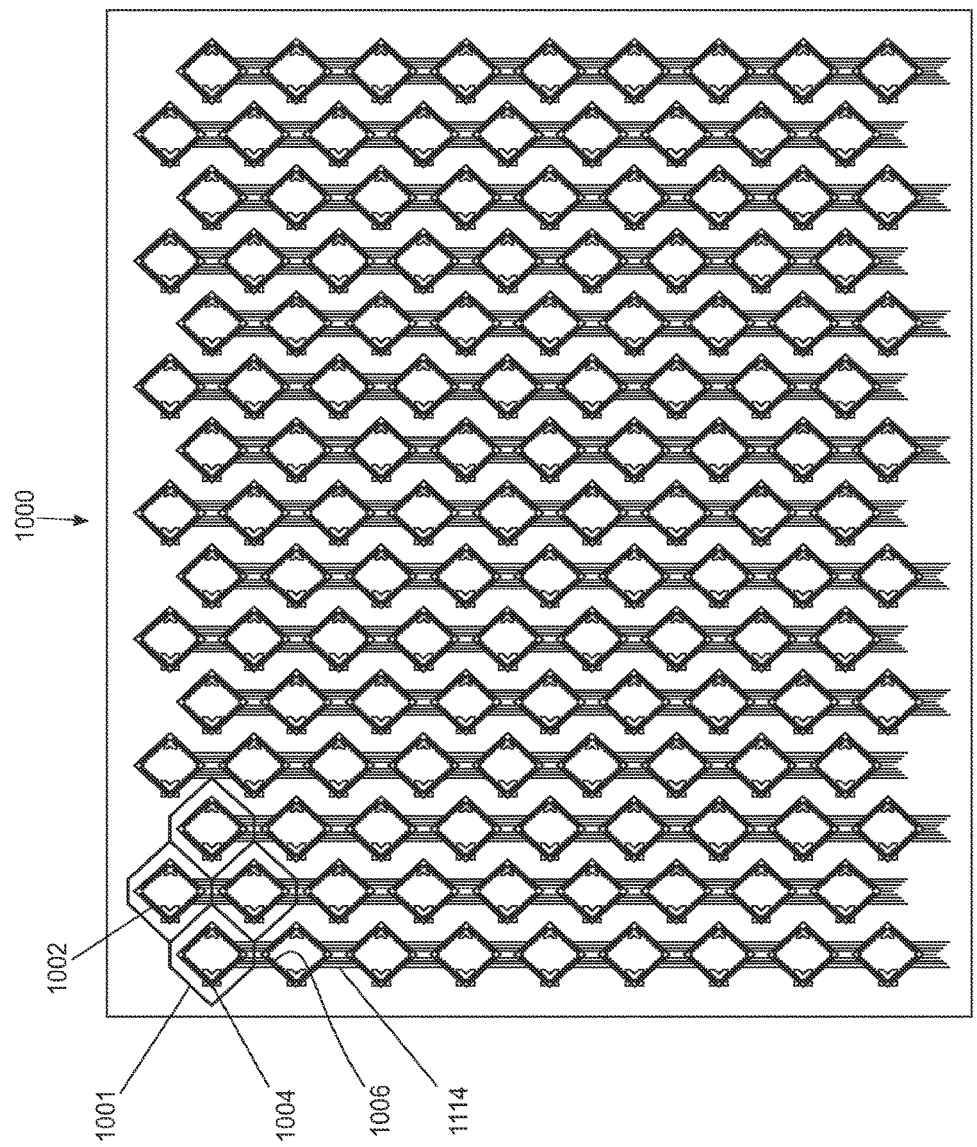
FIG. 11 shows schematically a top view of a phased array panel according to another embodiment of the invention.

As shown in FIG. 11, the ASIC's 1002 are electronically connected together in rows by data buses 1114 on the underside of top board 1008.

The data buses 1114 are configured to communicate the following signals:
Reference frequencies;
Summed received data, I and Q;
Data to be transmitted, I and Q;
Serial command data bus; and
Power supply.

The reference frequencies signals are configured to give phase control ranges to the local oscillators (synthesizers) to $+/-2\pi$ at the transmitted and received frequencies within the linear portion of the characteristic of the multiplier type phase discriminator. This frequency range is a compromise between time precision and transmission losses around the antenna top board 1008 at the high frequency on the differential transmission line on the PTFE substrate bottom layer 1108b. In this embodiment, the reference frequencies are $f_{TX}/64$ and $f_{RX}/64$, although in other embodiments the reference frequencies may be $f_{TX}/8$ and $f_{RX}/8$, or any other suitable value.

The summed in-phase and quadrature phase received data signals, I and Q, correspond to the composite signals $I_{out}$ and $Q_{out}$ on differential data buses 528, 530 illustrated in FIG. 5.

The data to be transmitted signals, I and Q, correspond to the in-phase and quadrature phase components of the $I_{data}$ and $Q_{data}$ signals illustrated in FIG. 9.

The data buses 1114 on the top board 1008 are in turn connected to the bottom board 1010 by a series of multi-pole connectors 1012 that run down a side wall of the panel 1000.

The bottom board 1010 carries signal processing 1018, power regulation 1020, frequency synthesis 1026 and interface 1024 circuits that are configured to send and/or receive the data on data buses 1114 and 1012. The reference frequencies signals are generated by frequency synthesis circuit 1026 in accordance with a signal generated by a central processing unit (CPU) such as the central controller 104 illustrated in FIG. 1. In embodiments where the phased array antenna is connected to the central controller 104 via a fiber optic system 106 as illustrated in FIG. 1, the frequency synthesis circuit 1026 may use the clock frequency of the fiber-optic system and/or central controller 104 as a reference when generating the reference frequencies signals.

The upper side of the top board 1008 and the lower side of the bottom board 1010 may have no components mounted thereon and no through-holes. This enables the phased array antenna panel 1010 to be sealed by a peripheral framework 1016 and confer mechanical rigidity to the phased array panel 1000. Each panel 1000 may have means for fixing the panel 1000 securely to a train carriage roof.

The panel 1100 has individual data connections (not shown) to the CPU, which in the embodiment shown in FIG. 1 are provided by optical fibers which may be of equal length and are hermetically sealed through the peripheral framework 1016 of the panel 1000. The panel 1000 is supplied with power wires and fiber tails (not shown) which are also hermetically sealed through the peripheral framework 1016.

In the embodiment shown in FIGS. 10 and 11, the ASIC's 1002 are Silicon-Germanium (SiGe) ASIC's. This provides an advantage over known Gallium-Arsenide (GaAs) ASIC's that are used in the prior art. Use of GaAs ASIC's in the prior art requires separate Silicon based chips to perform the logical processing required for implementation of the phased array antenna panel 1000.

Use of a SiGe ASIC according to embodiments of the invention enables a single ASIC to be used for each element thereby improving the efficiency of the phased array antenna system.

In other embodiments two ASIC's may be provided for a single element: one configured to perform processing when receiving data and the other configured to perform processing when transmitting data. Providing separate ASIC's may provide practical advantages in terms of packaging the layout of components on the top board 1008.

Figure 12:
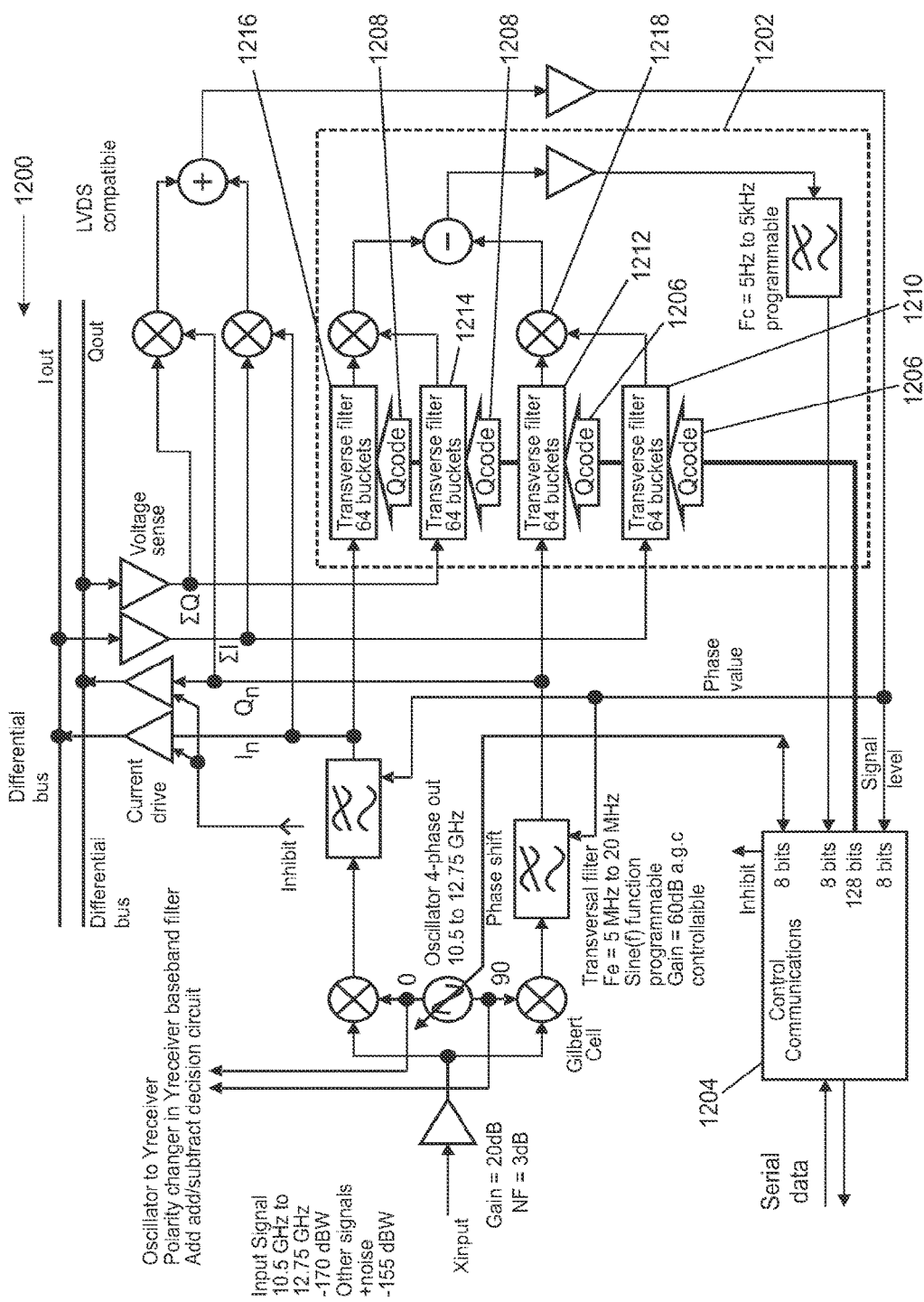
FIG. 12 shows a circuit diagram associated with a phased array element according to another embodiment of the invention.

FIG. 12 shows schematically another embodiment of a receiver 1200 associated with an element of a phased array antenna system according to an embodiment of the invention. Those features that are the same as those illustrated in FIG. 7 will not be described in detail here.

In this embodiment, the phase feedback component 1202 is configured to provide a signal representative of whether or not there is cross-contamination between the in-phase and quadrature phase components by comparing received signals with predetermined codes.

Satellites with which the phased array antenna element 1200 can communicate are configured to transmit a regularly repeating code unique to that satellite. The unique code comprises an in-phase and a quadrature phase component. The unique codes can be used by the phased array antenna to identify, and lock on to, a desired satellite. In this way the phased array antenna system can focus on the desired satellite to the exclusion of all other satellites transmitting on the same frequency, even if signals received from any of those other satellites are stronger than the signals received from the desired satellite.

In embodiments that receive signals that include the regularly repeating unique code, it may not be necessary to use a mechanical map or an electrical map to lock-on to the desired frequency, although doing so can increase the speed with which the phased array antenna system locks-on to the desired satellite.

The control communications component 1204 is configured to retrieve from memory the unique in-phase and quadrature phase codes 1206, 1208 that are associated with the desired satellite, and apply these codes 1206, 1208 to the phase feedback component 1202.

The phase feedback component 1202 is similar to the feedback arrangement 730 shown in FIG. 7, except that the phase feedback component 1202 of FIG. 12 is configured to apply the unique codes 1206, 1208 to correlators associated with each branch of the phase feedback component 1202 to determine if there is any cross correlation between the in-phase and quadrature phase components of the signal XInput received at the element 1200.

The in-phase unique code 1206 is applied to the composite in-phase component of the received signals $I_{out}$ by a transversal filter 1210, and is also applied to the quadrature phase component of the received signal Q by a transversal filter 1212. The outputs of these two transversal filters 1210, 1212 are provided to a multiplier component 1218 where any correlation is identified by a non-zero output signal of the multiplier component 1218 in the same way as the multiplier component 516 of FIG. 5.

Similarly, the quadrature phase unique code 1208 is applied to the composite quadrature phase component of the received signals $Q_{out}$ and the in-phase component of the received signal $I_n$ by transversal filters 1214, 1216 respectively.

In this embodiment the unique codes are 128 bits long, and it will be appreciated that codes of other bit lengths could also be used.

Figure 13:
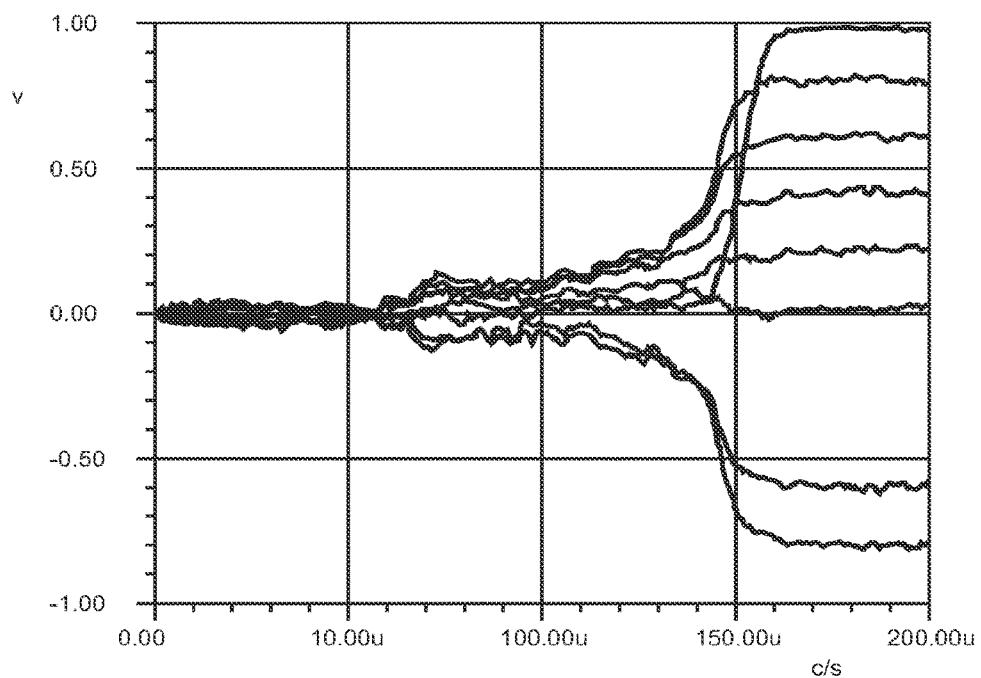
FIGS. 13 and 14 illustrate graphically the results of the simulation of a receiver according to an embodiment of the present invention.
Figure 14:
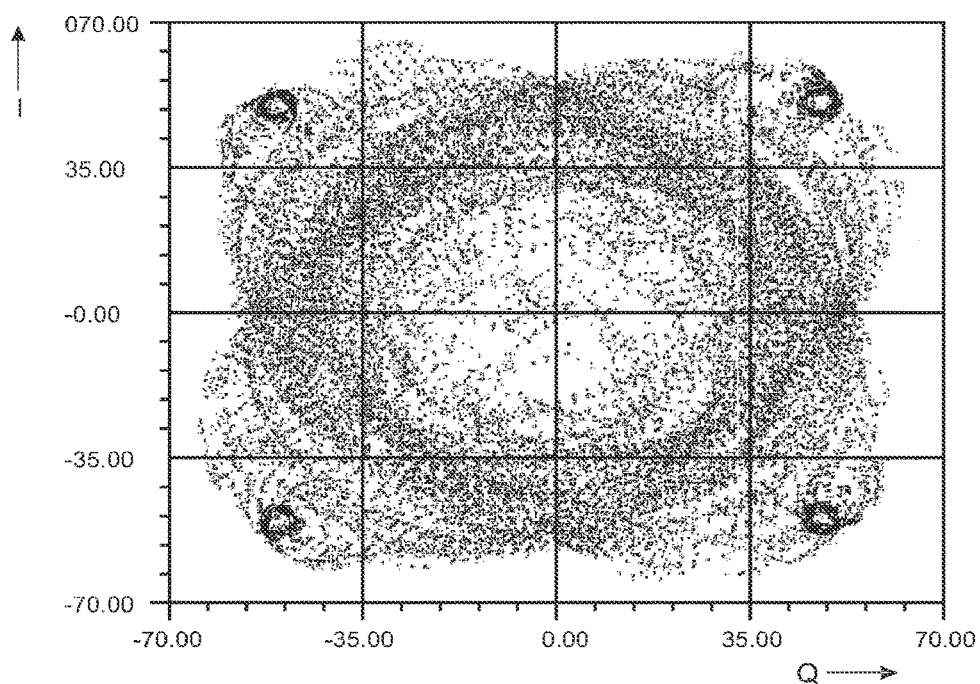

FIGS. 13 and 14 illustrate the results obtained when performing a computer simulation of sixty four elements/receivers 500 as illustrated in FIG. 5. Results are only shown for eight of the sixty four receivers in order to aid clarity.

Initially the simulation starts with zero phase shift between the element oscillators, and the desired signal is phase shifted by $\pi/5$ radians between elements.

FIG. 13 shows a graph of the voltage of the phase control signals of the eight elements against time. As the received signals are averaged out over time, and the phase control feedback signals are fed back to the local oscillators associated with the individual elements, the individual phase control signals separate out to account for the $\pi/5$ radian shift between the signals received at the elements. As can be seen from FIG. 13, the individual phase control signals have separated out after 170 μs.

FIG. 14 shows how the constellation alignment of the desired QPSK waveform evolves over time. Initially the desired QPSK waveform is obscured by noise and interference, and over time evolves into a clean pattern as the elements are aligned by the phase control signals. The signal-to-noise ratio improves to 10:1 over time as measured by the size of the constellation points.

The rotation of the element constellation to align with the consensus constellation is brought about by phase adjustment of the element local oscillator. The adjustment of the local oscillator phase is the action, the correlation of the local demodulated in-phase and quadrature phase signals (the constellation) as measured by the phase feedback arrangement derived from a Costas Loop, for example, is the result.

In some embodiments, a phased array antenna system according to an embodiment of the invention may be configured to transmit and receive signals having multiple frequencies, for example to provide broadband internet access. In such embodiments the signals received by elements of a phased array antenna panel acting as a receiver, and the signals transmitted by a phased array antenna panel acting as a transmitter, may be both phase aligned, as described in detail above, and temporally aligned by introducing a time delay component into the circuitry associated with each element. The time delay component may be introduced before signals from more than one element are added together, for example before summation component 208 in FIG. 2.

In some embodiments of the invention, the circuitry associated with the elements of a phased array antenna panel should be as dumb as possible. That is, processing should be performed centrally by software and/or firmware where possible as it is more convenient to change any algorithms that are stored centrally as opposed to on ASIC's associated with each element.

Embodiments of the invention can enable less accurately manufactured phased array antenna panels to be used that offer acceptable quality of performance. Less accurately manufactured phased array antenna panels can be used as the reliance upon theoretical or measured distances between elements is reduced. Phased array antenna panels according to embodiments of the invention can automatically focus a beam of maximum gain onto a desired data source/target iteratively based upon parameters of signals received at the elements.

Embodiments of the invention may provide a consensus of alignment of multiple elements in a phased array antenna system using a plurality of phase tracking circuits such as Costas loops, phase locked loops or n.sup.th power loops. A signal may be generated that is a composite of a plurality of demodulated signals, and the plurality of phase tracking circuits may be configured to adjust the phase of an output signal of local oscillators associated with the elements based on a comparison between the signal received at that element and the composite of the demodulated signals such that the output signal(s) of the elements are brought into conformity with each other. This may involve phase aligning the output signals of the local oscillators with the phase of communications signals received at those elements.

It will be appreciated that the invention is not limited to QPSK systems and that embodiments of the invention can be used with other modulation and multiplexing techniques. As an example, the invention may be used with communications systems that use orthogonal frequency-division multiplexing (OFDM), by simultaneously measuring the phase difference between the sub-carriers received at each element.

Insofar as embodiments of the invention described above are implementable, at least in part, using a software-controlled programmable processing device such as a general purpose processor or special-purposes processor, digital signal processor, microprocessor, or other processing device, data processing apparatus or computer system it will be appreciated that a computer program for configuring a programmable device, apparatus or system to implement the foregoing described methods, apparatus and system is envisaged as an aspect of the present invention. The computer program may be embodied as any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. A skilled person would readily understand that term "computer" in its most general sense encompasses programmable devices such as referred to above, and data processing apparatus and computer systems.

Suitably, the computer program is stored on a carrier medium in machine readable form, for example the carrier medium may comprise memory, removable or non-removable media, erasable or non-erasable media, writeable or re-writeable media, digital or analog media, hard disk, floppy disk, Compact Disk Read Only Memory (CD-ROM), Company Disk Recordable (CD-R), Compact Disk Rewriteable (CD-RW), optical disk, magnetic media, magneto-optical media, removable memory cards or disks, various types of Digital Versatile Disk (DVD) subscriber identify module, tape, cassette solid-state memory. The computer program may be supplied from a remote source embodied in the communications medium such as an electronic signal, radio frequency carrier wave or optical carrier waves. Such carrier media are also envisaged as aspects of the present invention.

What is claimed is:

1. A phased array antenna comprising:
a plurality of antenna elements, each configured to receive an electromagnetic signal and to generate an output signal in response to the received electromagnetic signal; and
a phase feedback system configured to compare the output signal of at least one antenna element with a consensus output signal representing a composite of output signals of more than two of the antenna elements to generate at least one phase control signal for bringing the output signal of said at least one antenna element in concordance with said consensus output signal.

2. The phase array antenna of claim 1, wherein the phase feedback system is configured to bring the output signal of said at least one antenna element in concordance with said consensus output signal by temporally aligning the output signal of said at least one antenna element with said consensus output signal.

3. The phased array antenna of claim 1, wherein the phase feedback system is configured to compare an in-phase component of the output signal of said at least one antenna element with a quadrature component of the consensus output signal to generate the phase control signal, wherein the phase control signal is representative of a degree of correlation between the in-phase component and the quadrature component.

4. The phased array antenna of claim 1, wherein the phase feedback system is configured to compare a quadrature component of the output signal of said at least one antenna element with an in-phase component of the consensus output signal to generate the phase control signal, wherein the phase control signal is representative of a degree of correlation between the in-phase component and the quadrature component.

5. The phased array antenna of claim 1, wherein the phase feedback system is configured to multiply an in-phase component of the output signal of said at least one antenna element with a quadrature component of the consensus output signal to generate a first correlation signal, to multiply an in-phase component of the consensus output signal with a quadrature component of the output signal of said at least one antenna element to generate a second correlation signal, and to subtract the first and second correlation signals to generate the phase control signal.

6. The phase array antenna of claim 1, wherein the phase control signal is configured to ensure that a time averaged multiplication of in-phase and quadrature output signals of said at least one antenna element is substantially zero.

7. The phased array antenna of claim 1, wherein the consensus output signal comprises a weighted composite of the output signals of said two or more antenna elements based on power-level control signals associated with said two or more antenna elements.

8. The phase array antenna of claim 7, wherein said weighted composite is calculated without including contributions of the output signals of any of said two or more antenna elements having a power level control signal below a threshold.

9. The phased array antenna of claim 1, wherein the phase feedback system is further configured to multiply an in-phase component of the output signal of each antenna element with an in-phase component of the consensus output signal to generate a first correlation signal, to multiply a quadrature component of the consensus signal with a quadrature component of the output signal of each antenna element to generate a second correlation signal, and to add the first and second correlation signals to generate a power-level control signal for each antenna element.

10. The phased array antenna of claim 1, wherein the phase feedback system is configured to compare the received signal at said at least one antenna element with a predetermined code to generate the phase control signal, which is representative of a degree of cross contamination between in-phase and quadrature components of the received signal.

11. The phased array antenna of claim 1, wherein the phase feedback system is configured to utilize a pre-stored mechanical map of position of said at least one antenna element to generate the phase control signal during initialization of the phased array antenna.

12. The phased array antenna of claim 1, wherein the electromagnetic signal is a communications signal.

13. The phased array antenna of claim 12, wherein said communications signal is a satellite communications signal.

14. The phased array antenna of claim 1, wherein at least one of said plurality of antenna elements is configured to transmit an electromagnetic signal.

15. The phase array antenna of claim 14, wherein said at least one of said plurality of antenna elements configured to transmit an electromagnetic signal comprises two or more of said antenna elements, and wherein phases of said two or more antenna elements are adjusted based on said at least one phase control signal so as to provide a transmission radiation pattern focused in a desired direction.

16. The phased array antenna of claim 1, wherein the phased array antenna comprises one or more additional antenna elements each of which is configured to transmit an electromagnetic signal.

17. The phase array antenna of claim 16, wherein said one or more additional antenna elements comprise two or more antenna elements, and wherein phases of said two or more antenna elements are adjusted based on said at least one phase control signal so as to provide a transmission radiation pattern focused in a desired direction.

18. A method for signal processing in a phased array antenna comprising:
- providing a plurality of antenna elements, each configured to receive an electromagnetic signal and to generate an output signal in response to the received electromagnetic signal;
- providing a consensus output signal representing a composite of output signals of at least a subset of the plurality of antenna elements, wherein said subset of the plurality of antenna elements comprises more than two of the antenna elements;
- comparing the output signal of each of the plurality of antenna elements with the consensus output signal; and
- generating, for each of said antenna elements, a phase control signal for temporally aligning the output signal of said antenna element with the consensus output signal.

19. The method of claim 18, wherein the step of comparing comprises comparing an in-phase component of the output signal of each antenna element with a quadrature component of the consensus signal to generate the phase control signal for that antenna element, wherein the phase control signal is representative of a degree of correlation between the in-phase component and the quadrature component.

20. The method of claim 18, wherein the step of comparing comprises comparing a quadrature component of the output signal of each antenna element with an in-phase component of the consensus signal to generate the phase control signal for that antenna element, wherein the phase control signal is representative of a degree of correlation between the in-phase component and the quadrature component.

21. The method of claim 18, wherein the step of comparing comprises, for each of said antenna elements, multiplying an in-phase component of the output signal of that antenna element with a quadrature component of the consensus signal to generate a first correlation signal, and multiplying an in-phase component of the consensus signal with a quadrature component of the output signal of that antenna element to generate a second correlation signal, and wherein the step of generating a phase control signal for that antenna element comprises subtracting the first and second correlation signals to generate the phase control signal.

22. The method of claim 18, further comprising steps of:
- multiplying, for each of said antenna elements, an in-phase component of the output signal of that antenna element with an in-phase component of the consensus output signal to generate a first correlation signal;
- multiplying a quadrature component of the consensus output signal with a quadrature component of the output signal of that antenna element to generate a second correlation signal; and
- adding the first and second correlation signals to generate a power-level control signal for that antenna element.

23. The method of claim 18, wherein step of providing the consensus output signal comprises providing a weighted composite of the output signals of said subset of the plurality of antenna elements based on a power-level control signal for each antenna element in said subset.

24. The method of claim 18, wherein the step of providing the consensus output signal comprises providing a composite of the output signals of the subset of the plurality of antenna elements, wherein the composite of said output signals is generated without including contributions from the output signals of one or more antenna elements, if any, having a power-level control signal less than a threshold.

25. The method of claim 18, wherein the step of generating a phase control signal for an antenna element comprises comparing the signal received by that antenna element with predetermined codes, such that the phase control signal is representative of a degree of cross contamination between in-phase and quadrature components of the received signals.

26. The method of claim 18, further comprising utilizing a pre-stored mechanical map of positions of the plurality of antenna elements to generate the phase feedback signals during initialization of the phased array antenna.

27. The method of claim 26, further comprising updating the mechanical map to generate an electrical map of the locations of the plurality of antenna elements based on the phase control signals.

28. The method of claim 18, wherein the electromagnetic signal is a communications signal.

29. The method of claim 18, wherein said communications signal is a satellite communications signal.

30. The method of claim 18, further comprising the step of transmitting an electromagnetic signal via at least one of the plurality of antenna elements.

31. The method of claim 18, wherein the step of transmitting an electromagnetic signal comprises using the at least one phase control signal.

* * * * *